US012441968B2

(12) United States Patent
Oliver

(10) Patent No.: US 12,441,968 B2
(45) Date of Patent: Oct. 14, 2025

(54) COCKTAIL SMOKING CHIMNEYS HAVING REPLACEABLE, INTERCHANGEABLE PARTS FOR MODIFYING THE FLAVOR, VOLUME AND PATTERN OF SMOKE INFUSED INTO BEVERAGES

(71) Applicant: Blake A. Oliver, Lebanon, NJ (US)

(72) Inventor: Blake A. Oliver, Lebanon, NJ (US)

( * ) Notice: Subject to any disclaimer, the term of this patent is extended or adjusted under 35 U.S.C. 154(b) by 780 days.

(21) Appl. No.: 17/227,344

(22) Filed: Apr. 11, 2021

(65) Prior Publication Data

US 2022/0325213 A1 Oct. 13, 2022

(51) Int. Cl.
*C12G 3/07* (2006.01)

(52) U.S. Cl.
CPC .................................... *C12G 3/07* (2019.02)

(58) Field of Classification Search
None
See application file for complete search history.

(56) References Cited

U.S. PATENT DOCUMENTS

| | | | | |
|---|---|---|---|---|
| 2014/0299005 A1* | 10/2014 | Vinett | .................... | A23B 4/052 99/482 |
| 2016/0355772 A1* | 12/2016 | Karasch | .................... | C12H 1/22 |
| 2021/0227842 A1* | 7/2021 | Middleton | ............... | A21B 1/28 |

* cited by examiner

*Primary Examiner* — Elizabeth M Kerr
(74) *Attorney, Agent, or Firm* — Charney IP Law LLC

(57) ABSTRACT

A cocktail smoking chimney for infusing smoke into beverages has replaceable parts. The cocktail smoking chimney includes a sealing base having top and bottom major surfaces one or more smoke transfer openings extending between the top and bottom major surfaces. A chimney stack has an upper end, a lower end with a bottom major surface, and a central opening extending from the upper end to the lower end. The central opening of the chimney stack is aligned with the one or more smoke transfer openings of the sealing base. A porous screen is disposed inside the central opening of the chimney stack. One or more fastening elements have a first configuration for securing the chimney stack to the sealing base and a second configuration for releasing the chimney stack from the sealing base so that a replacement chimney stack can be secured to the sealing base.

16 Claims, 17 Drawing Sheets

COCKTAIL SMOKING CHIMNEYS HAVING REPLACEABLE, INTERCHANGEABLE PARTS FOR MODIFYING THE FLAVOR, VOLUME AND PATTERN OF SMOKE INFUSED INTO BEVERAGES

BACKGROUND OF THE INVENTION

Field of the Invention

The present patent application is generally related to systems and devices for generating smoke, and is more specifically related to system, devices, and methods for infusing smoke into beverages such as cocktails and alcoholic drinks.

Description of the Related Art

There have been a few efforts directed to generating smoke and infusing smoke into food and beverages. For example, U.S. Pat. No. 6,481,344 to Green et al. discloses a smoke generating device for use in providing flavored smoke in a controlled manner. The smoke generating device includes a non-combustible, sealed, pressurizable container. An organic matter disposed within the container can produce a smoke without igniting. The container has at least one perforation, which enables the container to become pressurized so that smoke flows out of the container in a controlled direction and at a velocity that does not combust during heating of the container.

U.S. Pat. No. 6,705,213 to Thomas discloses a smoke generator having an air pump with a control valve to supply a continuous controllable air supply to a smoking fuel disposed on a grid in a fire box. Smoke is directed to a food processor from a smoke output within the fire box and above the grid. A chimney extends from the top of the fire box. The first box is filled with a fuel that is not in the air stream, so it does not burn. As the fuel on the grid is consumed, fuel from the chimney drops onto the grid, which provides a continuous feed of fresh fuel so that the smoke generator can, while unattended, generate a uniform controllable stream of smoke over a long period of time. A disposable fuel cartridge is provided for ease of use.

U.S. Pat. No. 6,971,305 to Thomas discloses an assembly for generating a continuous stream of smoke for food processing (e.g., barbecue cooking). The assembly includes a reusable cartridge holder for holding upright a disposable smoke generating cartridge. The cartridge includes an outer covering enclosing a chamber. The covering includes a perforated top, a non-perforated upper portion designed to not burn during the process, and a readily combustible lower portion. At the bottom of the chamber is a readily combustible tinder material that is easily set afire by the burning lower portion. The balance of the chamber is filled with wood pellets that smolder and emit desirable smoke when ignited by the tinder, the smoke passing upward through the perforated top. The convection currents produce a stream of smoke without the need for a fan. The pellets do not fall through the cartridge after the bottom portion burns away because they swell up and are held in place within the upper portion.

US 2020/0107565 to Swayne et al. disclose a device for injecting dry smoke into a food product. The device includes a smoke injector having an external wall with a plurality of apertures formed therein that communicate with a smoke-injector conduit. The smoke-injector conduit is in fluid communication with a smoke reservoir that houses dry smoking media therein. A fan directs dry smoke produced from the dry smoking media into the smoke-injector conduit so that the dry smoke is eluted through said plurality of apertures to introduce the dry smoke to an interior of a food product that has been impaled by the smoke injector.

US 2020/0221718 to Flood et al. disclose a smoke generation pod for use in a smoke generation system. The smoke generation pod includes an enclosure that has disposed therein a material such as wood that is heated or ignited by a heating element housed within the smoke generation pod, receiving energy from an induction coil. The smoke generation pod has an input vent for accepting air and an output vent for distributing smoke. The smoke is routed to an object such as a glass (with or without a liquid there within) for infusing the smoke into the liquid or onto the object. In some embodiments, the output vent has a filter. In some embodiments, some filters remove some or all the carcinogens from the smoke that is emitted.

CN 202311122 discloses a low-temperature smoke generator. The smoke generator includes an outer barrel, an inner barrel, and a base, whereby the shape of the base is matched with those of the outer barrel and the inner barrel. The inner barrel is arranged in the outer barrel. The outer barrel and the inner barrel are arranged on the base. The bottom of the outer barrel is open, and the top of the outer barrel is sealed. The top of the inner barrel is open, and the bottom of the inner barrel is sealed. An annular smoke and air space is formed among the outer barrel, the inner barrel, and the base. A side wall of the outer barrel is equal to or higher than that of the inner barrel. The base is a concave or convex annular cylinder. The low-temperature smoke generator has a simple structure and a small overall volume, is convenient to detach and has a low cost.

Despite the above advances, there remains a need for improved systems, devices, and methods for infusing smoke into beverages such as cocktails. There also remains a need for efficient, economical, mobile, and simplified systems, devices, and methods for infusing smoke into beverages.

SUMMARY OF THE INVENTION

In one embodiment, a cocktail smoking chimney for infusing smoke into a beverage preferably has replaceable and/or interchangeable parts including but not limited to replaceable and/or interchangeable chimney stacks, replaceable and/or interchangeable porous screens for supporting combustible materials, and replaceable and/or interchangeable sealing bases that are adapted to fit over the open, upper ends and/or rims of drinking glasses (e.g., martini glasses).

In one embodiment, the parts of the cocktail smoking chimney may be secured together using one or more fastening elements such as screws or clips. The one or more fastening elements may be removed from the cocktail smoking chimney to enable the component parts to be disassembled from one another and replaced with one or more new parts.

In one embodiment, male and female parts having threads may be added to the chimney stacks and the sealing bases to enable the chimney stacks and sealing bases to be releasably secured to one another (e.g., a threaded connection for securing a chimney stack to a sealing base).

In one embodiment, the chimney stacks and the sealing bases may have tongue-in-groove parts integrated therein for enabling the chimney stacks and sealing bases to be releasably secured to one another (e.g., a press fit connection for securing a chimney stack to a sealing base).

In one embodiment, the cocktail smoking chimneys may be provided in kits including two or more chimney stacks, two or more porous screens and two or more sealing bases.

In one embodiment, a replacement part may be used to change the flavor of the smoke that is infused into a beverage. For example, a first chimney stack made of cherry wood may be replaced by a second chimney stack made of oak wood to change the flavor of the smoke that is infused into a beverage.

In one embodiment, a replacement part may be used to change the volume and/or the flow pattern of the smoke that is infused into a beverage. For example, a first chimney stack having a first height may be replaced by a second chimney stack having a second height that is greater than the first height. In another embodiment, a first porous screen having a first mesh size may be replaced by a second porous screen having a second mesh size for modifying the volume of smoke that is infused into a beverage.

In one embodiment, a replacement part may be used to customize the cocktail smoking chimney for use with a drinking glass having a particular shape. For example, a first sealing base may be used to seal the open, upper end of a drinking glass having a cylindrical shaped outer wall (e.g., a beer glass). When the cocktail smoking chimney is used on a different type of drinking glass, the first sealing base may be swapped out for a second sealing base that is adapted to seal the open, upper end of a drinking glass having a sloping outer wall (e.g., a martini glass).

In one embodiment, a worn-out component or part of a cocktail smoking chimney may be removed and replaced with a new part. For example, a first porous screen that supports combustible material may wear out after repeated uses, thereby requiring a new, second porous screen to be used to replace the first porous screen.

In one embodiment, a first porous screen having smaller openings may be used when wood powder, having a very fine consistency, is burned to generate smoke, and a second porous screen having larger openings may be used when wood chips, having a larger size, are burned to generate smoke.

In one embodiment, a cocktail smoking chimney for infusing smoke into a beverage preferably includes a sealing base having a top major surface, a bottom major surface, and one or more smoke transfer openings extending from the top major surface to the bottom major surface of the sealing base.

In one embodiment, a cocktail smoking chimney for infusing smoke into a beverage preferably includes a chimney stack having an upper end, a lower end with a bottom major surface, and a central opening extending from the upper end to the lower end of the chimney stack. When the chimney stack is secured to the sealing base, the central opening of the chimney stack is preferably aligned with the one or more smoke transfer openings of the sealing base.

In one embodiment, the chimney stack may be made of wood including but not limited to apple, hickory, pecan, maple, cherry, oak, barrel-aged wood, and wood infused with mesquite.

In one embodiment, the chimney stack may be made of metal.

In one embodiment, a cocktail smoking chimney for infusing smoke into a beverage preferably includes a porous screen disposed inside the central opening of the chimney stack. In one embodiment, the porous screen is preferably located adjacent the lower end of the chimney stack. In one embodiment, the central opening of the chimney stack and the porous screen define a combustion chamber that is configured to receive a combustible material.

In one embodiment, a cocktail smoking chimney for infusing smoke into a beverage preferably includes one or more fastening elements having a first configuration for securing the chimney stack to the sealing base and a second configuration for releasing the chimney stack from the sealing base.

In one embodiment, when the chimney stack is secured to the sealing base, the bottom major surface of the chimney stack desirably engages the top major surface of the sealing base for preventing any smoke from escaping between the lower end of the chimney stack and the top side of the sealing base.

In one embodiment, the one or more fastening elements are moveable into a first configuration for releasing the first chimney stack from the sealing base.

In one embodiment, the cocktail smoking chimney may include a second chimney stack that is designed to replace the first chimney stack.

In one embodiment, the one or more fastening elements are moveable into a second configuration for securing the second chimney stack from the sealing base.

In one embodiment, the sealing base is made of metal or wood.

In one embodiment, the sealing base has a disc shape.

In one embodiment, the sealing base has a center, and the chimney stack is aligned with the center of the sealing base.

In one embodiment, the smoke directing depression is aligned with the center of the sealing base.

In one embodiment, the one or more fastening elements may include one or more threaded screws that are adapted to pass through the sealing base and the chimney stack for securing the chimney stack to the sealing base.

In one embodiment, a combustion chamber is disposed inside the chimney stack, and a smoke directing depression is formed in the bottom major surface of the sealing base that surrounds the one or more smoke transfer openings. In one embodiment, the combustion chamber disposed within the chimney stack is in alignment with the one or more smoke transfer openings formed in the sealing base.

In one embodiment, the upper ends of the one or more smoke transfer openings are in communication with the central opening of the chimney stack and lower ends of the one or more smoke transfer openings are surrounded by the smoke directing depression.

In one embodiment, a combustible material is disposed within the combustion chamber of the chimney stack. In one embodiment, the combustible material may be wood chips, wood powder, and/or spices.

In one embodiment, the wood chips and the wood powder may be made of one or more of the following types of wood: apple, hickory, pecan, maple, cherry, and oak. In one embodiment, the wood chips and wood powder may include barrel-aged wood or mesquite infused wood.

In one embodiment, the spices placed into the combustion chamber may include cinnamon, rosemary and/or chai.

In one embodiment, a kit for infusing smoke into a beverage preferably includes a sealing base having a top major surface, a bottom major surface, and one or more smoke transfer openings extending from the top major surface to the bottom major surface of the sealing base.

In one embodiment, the kit preferably includes two or more chimney stacks that are adapted to be secured over the top major surface of the sealing base, each chimney stack having an upper end, a lower end with a bottom major surface, and a central opening extending from the upper end to the lower end of the chimney stack. The central opening of the chimney stack is preferably aligned with the one or more smoke transfer openings of the sealing base.

In one embodiment, the kit preferably includes a porous screen that is disposed inside the central opening of the chimney stack, adjacent the lower end of the chimney stack. In one embodiment, the central opening of the chimney stack and the porous screen define a combustion chamber of the chimney stack.

In one embodiment, the kit includes one or more fastening elements having a first configuration for securing the two or more chimney stacks to the sealing base and a second configuration for releasing the two or more chimney stacks from the sealing base, wherein only one of the two or more chimney stacks is secured over the top major surface of the sealing base at any one time.

In one embodiment, a smoke directing depression is preferably formed in the bottom major surface of the sealing base. In one embodiment, the combustion chamber of the chimney stack is in alignment with the one or more smoke transfer openings formed in the sealing base and the smoke directing depression formed in the bottom major surface of the sealing base.

In one embodiment, a method of infusing smoke into a beverage preferably includes obtaining a cocktail smoking chimney having a sealing base having a top major surface, a bottom major surface, and one or more smoke transfer openings extending from the top major surface to the bottom major surface of the sealing base, a chimney stack having an upper end, a lower end with a bottom major surface, and a central opening extending from the upper end to the lower end of the chimney stack, wherein the central opening of the chimney stack is aligned with the one or more smoke transfer openings of the sealing base, a porous screen disposed inside the central opening of the chimney stack, adjacent the lower end of the chimney stack, and one or more fastening elements disposed in the sealing base and the chimney stack for securing the chimney stack to the sealing base.

In one embodiment, the method preferably includes removing the one or more fastening elements from the sealing base and the chimney stack for releasing the chimney stack from the sealing base, positioning a second chimney stack over the top major surface of the sealing base so that a bottom major surface of the second chimney stack is in contact with the top major surface of the sealing base, and inserting the one or more fastening elements into the sealing base and the second chimney stack for securing the second chimney stack to the sealing base.

In one embodiment, the method may include removing the porous screen from the central opening of the chimney stack and inserting a second porous screen into the central opening of the chimney stack, adjacent the lower end of the chimney stack.

In one embodiment, the bottom major surface of the sealing base has a smoke directing depression that surrounds the one or more smoke transfer openings of the sealing base.

In one embodiment, after the second chimney stack has been secured to the sealing base, a central opening of the second chimney stack is preferably in alignment with the one or more smoke transfer openings formed in the sealing base.

In one embodiment, a method of infusing smoke into a beverage may include pouring a beverage into a drinking glass and placing a cocktail smoking chimney made of wood over a rim at an open, upper end of the drinking glass to define a sealed space inside the drinking glass that is located between an underside of the cocktail smoking chimney and a top surface of the beverage.

In one embodiment, the cocktail smoking chimney preferably includes a sealing base having a top major surface that faces away from the drinking glass and a bottom major surface that is in contact with the rim at the open upper end of the drinking glass, a chimney stack projecting from the top major surface of the sealing base, a combustion chamber disposed within the chimney stack, and one or more smoke transfer openings formed in the sealing base that extend from the combustion chamber to an underside of the sealing base.

In one embodiment, the method may include directing a flame into the combustion chamber for burning the wood inside the combustion chamber to generate smoke that passes through the one or more smoke transfer openings and into the sealed space between the bottom major surface of the sealing base and the top major surface of the beverage.

In one embodiment, prior to directing the flame into the combustion chamber, a combustible material may be placed inside the combustion chamber.

In one embodiment, the smoke directing depression formed in the bottom major surface of the sealing base desirably has a ring shape and surrounds the lower ends of the one or more smoke transfer openings formed in the sealing base. The smoke directing depression may direct the smoke toward the top surface of the beverage to minimize the likelihood of the smoke curling outwardly over the bottom major surface of the sealing base toward the outer perimeter of the sealing base where it could escape from the sealed space rather than be infused into the beverage.

In one embodiment, the cocktail smoking chimneys disclosed herein may incorporate one or more of the features disclosed in commonly owned U.S. patent application Ser. No. 17/158,179, the disclosure of which in hereby incorporated by reference herein.

These and other preferred embodiments of the present patent application will be described in more detail herein.

DETAILED DESCRIPTION OF PREFERRED EMBODIMENTS

Figure 1:
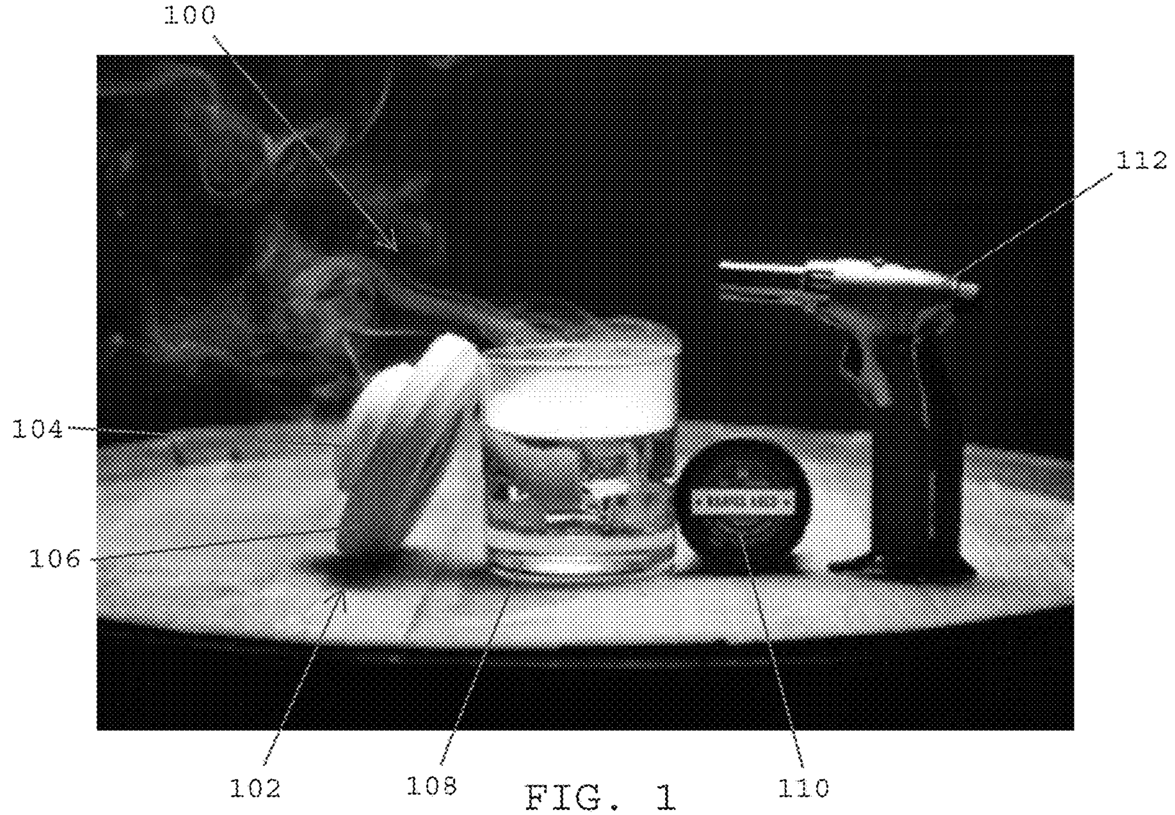
FIG. 1 shows a system for infusing smoke into beverage including a cocktail smoking chimney having replaceable parts, a drinking glass, a container for holding a combustible material, and a lighter for igniting the combustible material, in accordance with one embodiment of the present patent application.

Referring to FIG. 1, in one embodiment, a system 100 for infusing smoke into a beverage (e.g., a cocktail; an alcoholic drink) preferably includes a cocktail smoking chimney 102 having a chimney stack 104 and a sealing base 106. In one embodiment, the system 100 may also include a drinking glass 108 (e.g., a cocktail glass), a container 110 that is configured for storing combustible material (e.g., wood chips; wood powder; spices), and a lighter 112 (e.g., a butene torch) that generates a flame for burning the combustible material.

As will be described in more detail herein, in one embodiment, the combustible material that is stored in the container 110 may be packed into a combustion chamber of the chimney stack 104 of the cocktail smoking chimney 102. After being packed into the combustion chamber of the chimney stack 104, the combustible material may be ignited by the lighter 112. The combustible material preferably burns for generating smoke that may be infused into a beverage for creating a smoke infused beverage that is held within the drinking glass 108.

In one embodiment, one or more of the components of the cocktail smoking chimney 102 may be made of wood. In one embodiment, the cocktail smoking chimney may be made of one or more of the following types of wood: apple, hickory, pecan, maple, cherry, and oak. In one embodiment, the wood may include barrel-aged wood or mesquite infused wood.

In one embodiment, the chimney stack 104 may be made of a first type of wood and the sealing base may be made of a second type of wood. In one embodiment, the chimney stack 104 may be made of wood and the sealing base 106 may be made of metal.

In one embodiment, the combustible material that is burned to generate smoke may include various types of woods including but not limited to apple, hickory, pecan, maple, cherry, oak, barrel-aged wood, and/or wood infused with mesquite.

Figure 2:
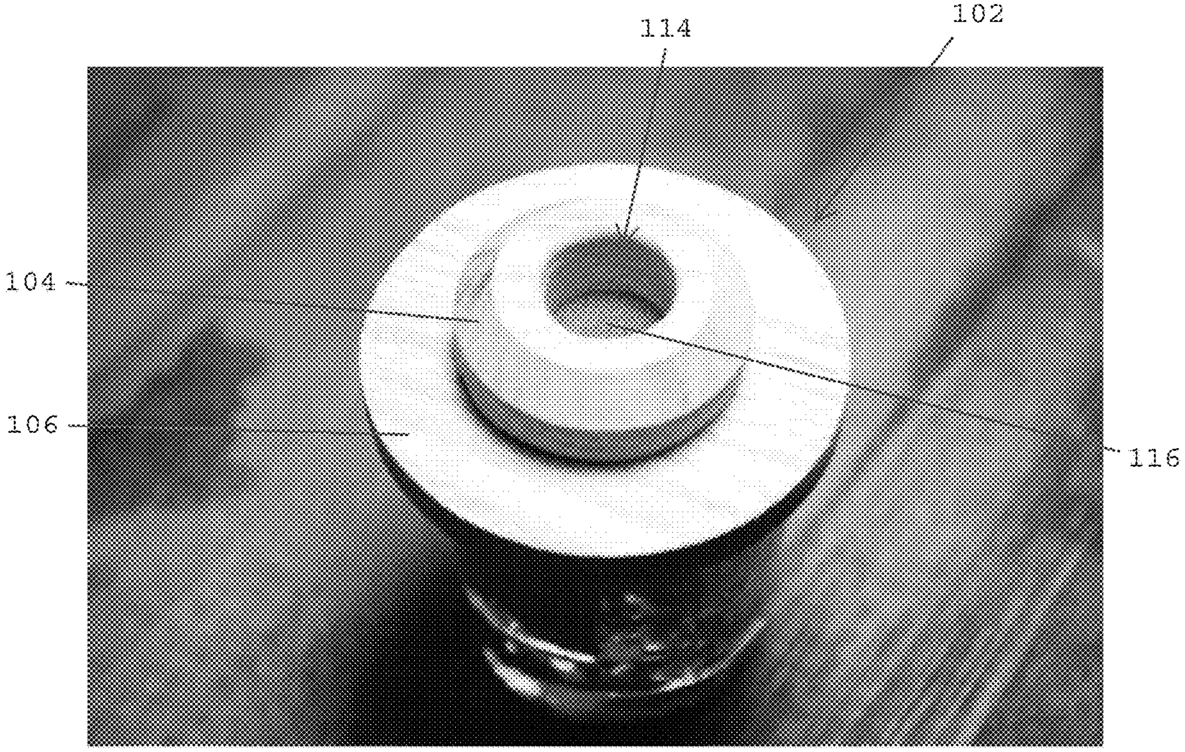
FIG. 2 is a perspective of the cocktail smoking chimney of FIG. 1 placed atop an open, upper end of the drinking glass of FIG. 1, in accordance with one embodiment of the present patent application.

Referring to FIG. 2, in one embodiment, the cocktail smoking chimney 102 preferably includes the chimney stack 104 that is secured atop the sealing base 106. In one embodiment, the chimney stack 104 has a central opening 114, which preferably defines a combustion chamber, which is adapted to receive the combustible material (e.g., wood powder; wood chips; spices) that is burned for generating smoke. In one embodiment, the cocktail smoking chimney 102 preferably includes a porous screen 116 that may be positioned inside the central opening 114 of the chimney stack 104. The porous screen 116 may be positioned adjacent a lower end of the central opening 114 for defining a lower end of the combustion chamber of the chimney stack 104.

Figure 3A:
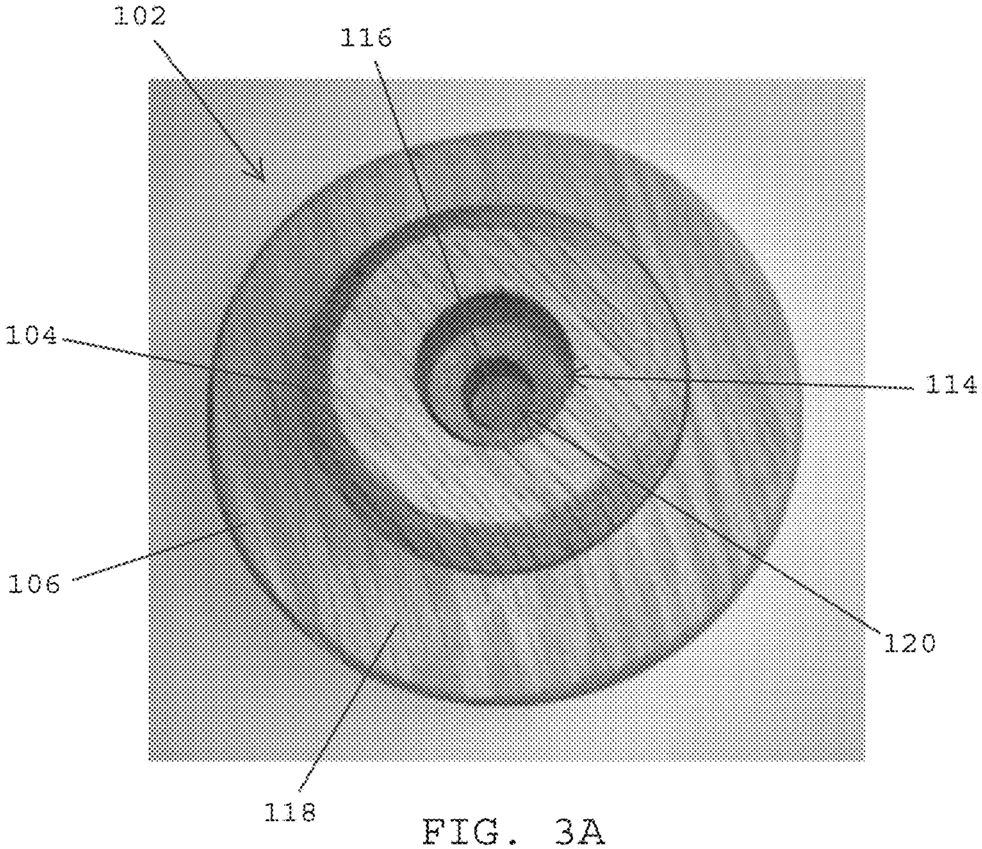
FIG. 3A is a top perspective view of the cocktail smoking chimney shown in FIG. 2.
Figure 3B:
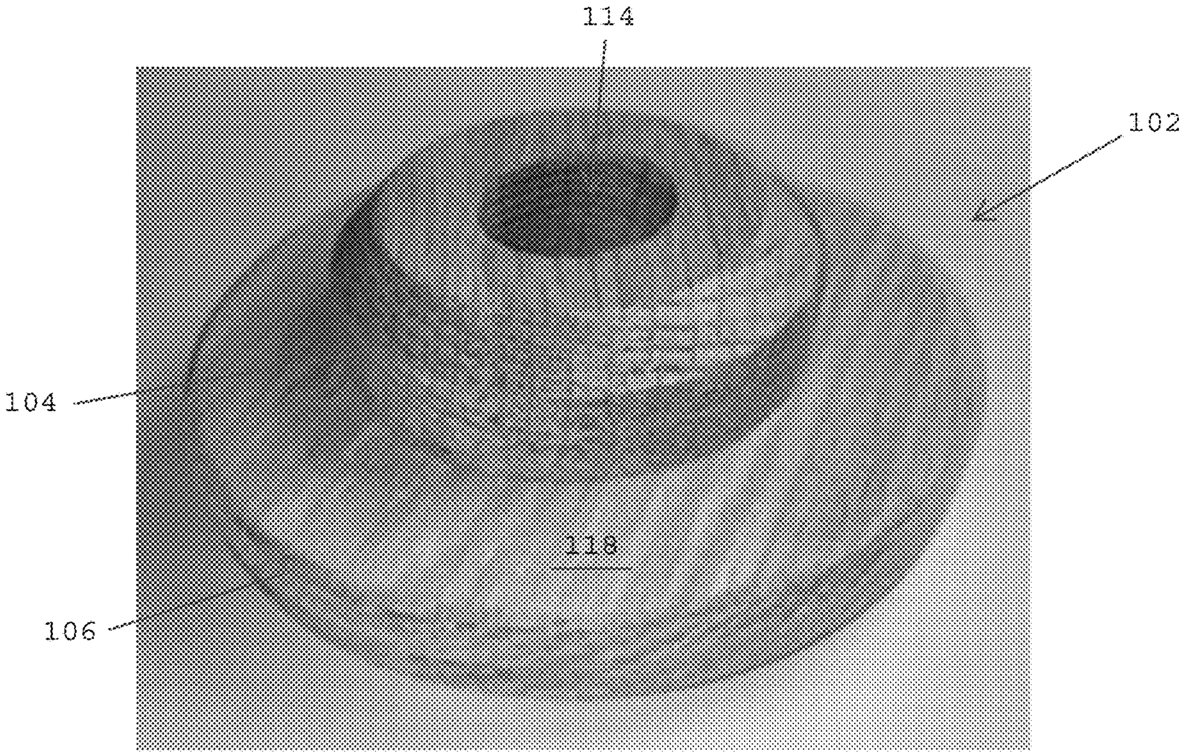
FIG. 3B is another perspective view of the cocktail smoking chimney shown in FIG. 2.

Referring to FIGS. 3A and 3B, in one embodiment, the chimney stack 104 is secured atop the sealing base 106 so that the central opening of the chimney stack 104 is aligned with a central opening 120 (FIG. 6) that passes through the sealing base 106. The porous screen 116 is preferably positioned within the chimney stack central opening 114 of the chimney stack 104. In one embodiment, the porous screen 116 is positioned at a lower end of the chimney stack central opening 114, adjacent the bottom major surface 138 (FIG. 7) of the chimney stack 104. In one embodiment, when the chimney stack 104 is assembled with the sealing base 106, the bottom major surface 138 (FIG. 7) of the chimney stack 104 preferably contacts the top major surface 118 of the sealing base 106 to form an air-tight seal between the bottom major surface of the chimney stack and the top major surface of the sealing base. In one embodiment, as smoke flows from the combustion chamber of the chimney stack 104 and through the central opening 120 of the sealing base 106 for being infused into a beverage inside a drinking glass, the air-tight seal between the bottom major surface of the chimney stack and the top major surface of the sealing base 106 desirably prevents smoke from escaping laterally between the lower end of the chimney stack 104 and the top side of the sealing base 106.

Figure 4:
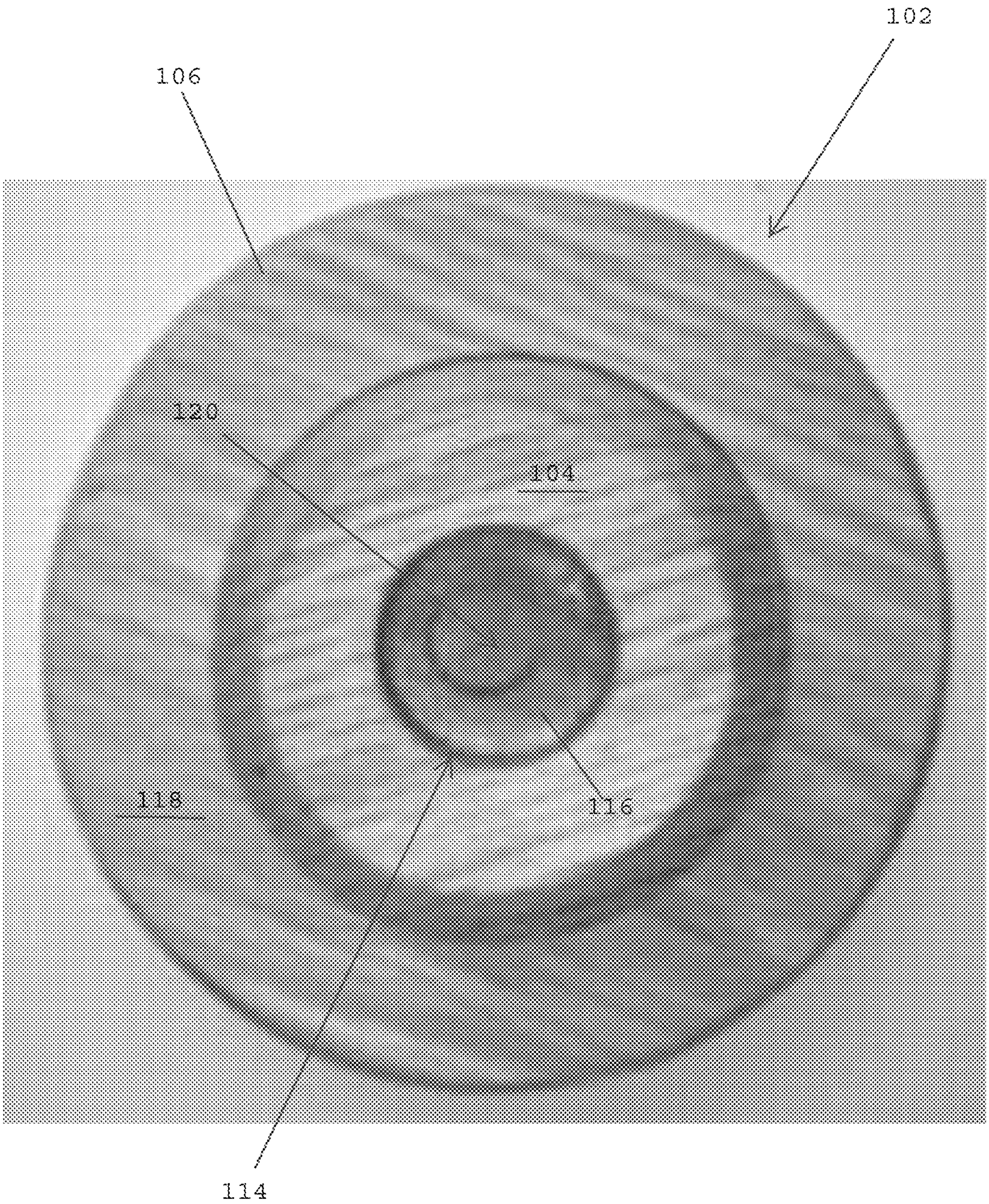
FIG. 4 is a top plan view of the cocktail smoking chimney shown in FIGS. 2, 3A, and 3B.

Referring to FIG. 4, in one embodiment, the chimney stack 104 is preferably secured over the top major surface 118 of the sealing base 106. The chimney stack 104 has the chimney stack central opening 114 and the sealing base 106 has the smoke transfer opening 120 (FIG. 6) that are preferably aligned with one another to provide a fluid passageway that allows the smoke to travel from the combustion chamber of the chimney stack 104 to an underside of the sealing base 106 for infusing the smoke into a beverage.

In one embodiment, the porous screen 116 is desirably positioned inside a lower end of the chimney stack central opening 114 to define a combustion chamber that is located inside the chimney stack 104. As will be described in more detail herein, combustible material such as wood chips, wood powder, spices, etc. may be placed and/or packed inside the combustion chamber, whereupon the combustible material overlies a top surface of the porous screen 116. The combustible material may be ignited using a lighter, such as a butane torch, for burning the combustible material to generate smoke that passes through the aligned, respective central openings that extend through the chimney stack 104 and the sealing base 106.

Figure 5:
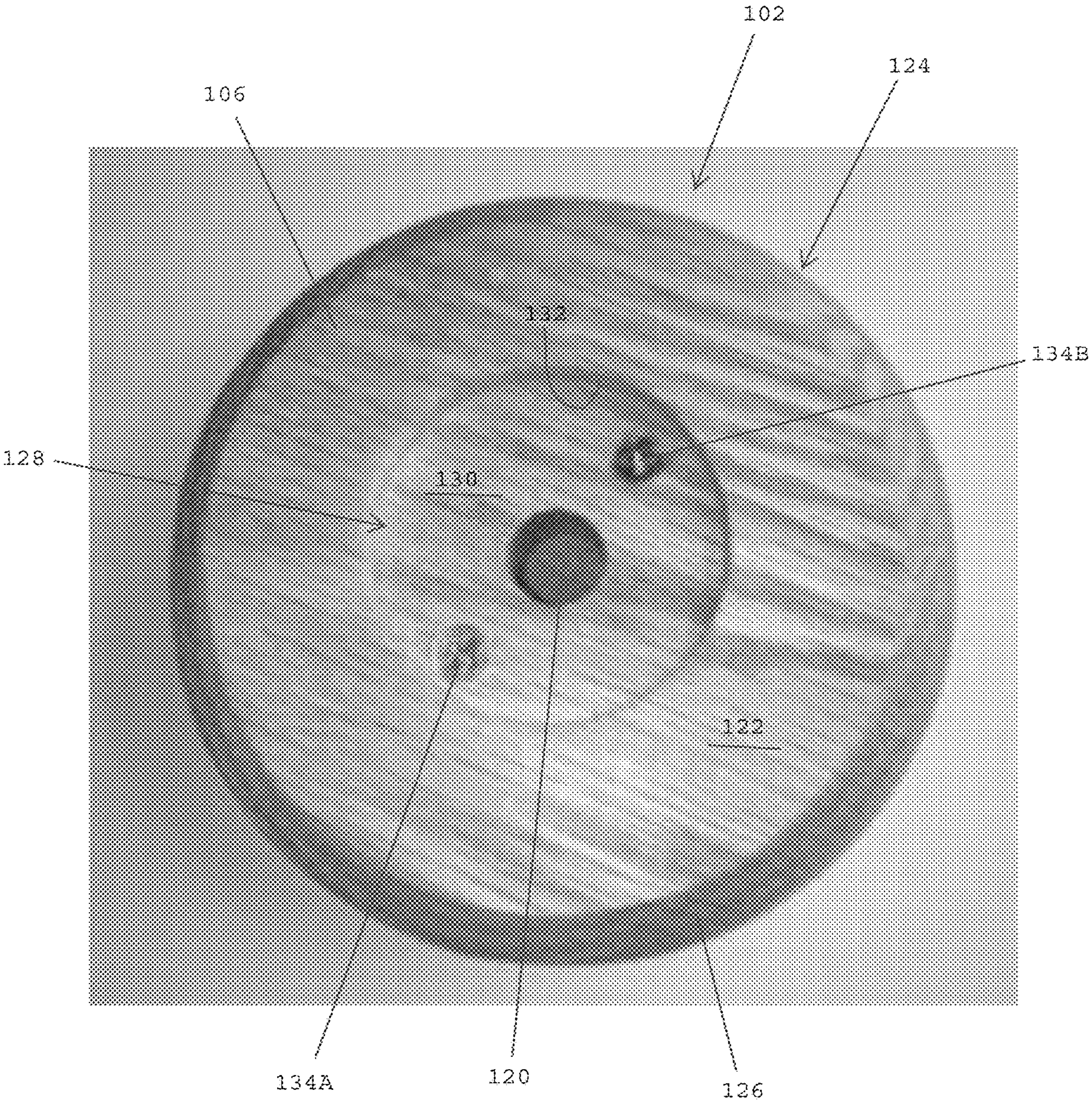
FIG. 5 is a bottom view of the cocktail smoking chimney shown in FIG. 4.

Referring to FIG. 5, in one embodiment, an underside of the sealing base 106 preferably has a bottom major surface 122 that extends to an outer perimeter 124 of the sealing base 106. In one embodiment, the outer perimeter 124 of the sealing base 106 desirably has a sloping surface 126 that is designed to form a seal between the outer perimeter 124 of the sealing base 106 and an inner surface of a cocktail glass. As a result, when the cocktail smoking chimney 102 is positioned atop a drinking glass, the sloping surface 126 of the sealing base 106 preferably engages and forms an air-tight seal with the open, upper end of the drinking glass so that smoke may not escape laterally between the sealing base and the open, upper end of the drinking glass.

In one embodiment, the sealing base 106 includes the smoke transfer opening 120 that desirably passes completely through the thickness of the sealing base 106. In one embodiment, the smoke transfer opening desirably has an upper end in communication with the combustion chamber and a lower end in communication with an underside of the sealing base. The smoke transfer opening 120 preferably enables smoke that is generated within the combustion chamber of the chimney stack to pass through the porous screen 116 (FIG. 2) assembled with the chimney stack 104, through the smoke transfer opening 120, and into a drinking glass for infusing smoke into a beverage that is disposed within the drinking glass.

In one embodiment, a smoke directing depression 128 is preferably formed in the bottom major surface 122 of the sealing base 106. In one embodiment, the smoke directing depression 128 may have an annular or circular shape and may be concentric around the smoke transfer opening 120 formed in the sealing base 106. In one embodiment, the smoke directing depression 128 preferably defines a recessed surface 130 that is sunk into the bottom major surface 122 of the sealing base 106. The smoke directing depression 128 and the recessed surface 130 preferably define a vertically extending, smoke directing surface 132 that preferably directs the smoke in a vertical orientation (i.e., perpendicular to the recessed surface 130) toward the open, upper end of the drinking glass, while preventing the smoke from flowing laterally (i.e., curling) toward the outer perimeter 124 of the sealing base 106. Thus, the unique structure of the smoke directing depression 128, the recessed surface 130, and the vertically extending, smoke directing surface 132 ensure that the smoke that exits through the smoke transfer opening 120 is directed in a vertical orientation into the open, upper end of the drinking glass and does not curl over the bottom major surface 122 of the sealing base toward the outer perimeter 124 of the sealing base 106.

In one embodiment, the bottom major surface or an outer perimeter section of the sealing base may be tapered so that when the sealing base is placed over an open, upper end of a drinking glass, the sealing base will self-center on the rim of the drinking glass to ensure that smoke directed into the enclosed space between the underside of the sealing base and a top surface of a beverage poured into the drinking glass will remain within the enclosed space for infusing into the beverage and so that the smoke cannot escape from the drinking glass between the via the outer perimeter of the sealing base and the opposing rim of the drinking glass.

In one embodiment, the sealing base may have a larger outer diameter than the size of the opening at the open, upper end of the drinking glass. In one embodiment, the bottom major surface 122 of the sealing base 106 contacts the rim of the drinking glass to form an effective seal between the underside of the sealing base and the rim of the drinking glass.

In one embodiment, the chimney stack 104, the sealing base 106, and the porous screen 116 (FIG. 2) may be disassembled from one another so that replacement parts may be utilized in the cocktail smoking chimney. For example, a kit may be provided having two or more chimney stacks, two or more porous screens and two or more sealing bases. In one embodiment, a worn-out, first chimney stack may be disassembled from the sealing base and a new, second chimney stack may be assembled with the sealing base. In one embodiment, a worn-out, first porous screen may be disassembled from the chimney stack and a new, second porous screen may be assembled with the chimney stack. In one embodiment, fastening elements 134A, 134B (e.g., threaded fasteners) may be utilized for releasably securing the chimney stack over the top major surface of the sealing base. In one embodiment, the fastening elements may pass through the sealing base and the chimney stack for holding the sealing base and the chimney stack together. In one embodiment, the fastening elements 134A, 134B may be threaded screws.

Figure 6:
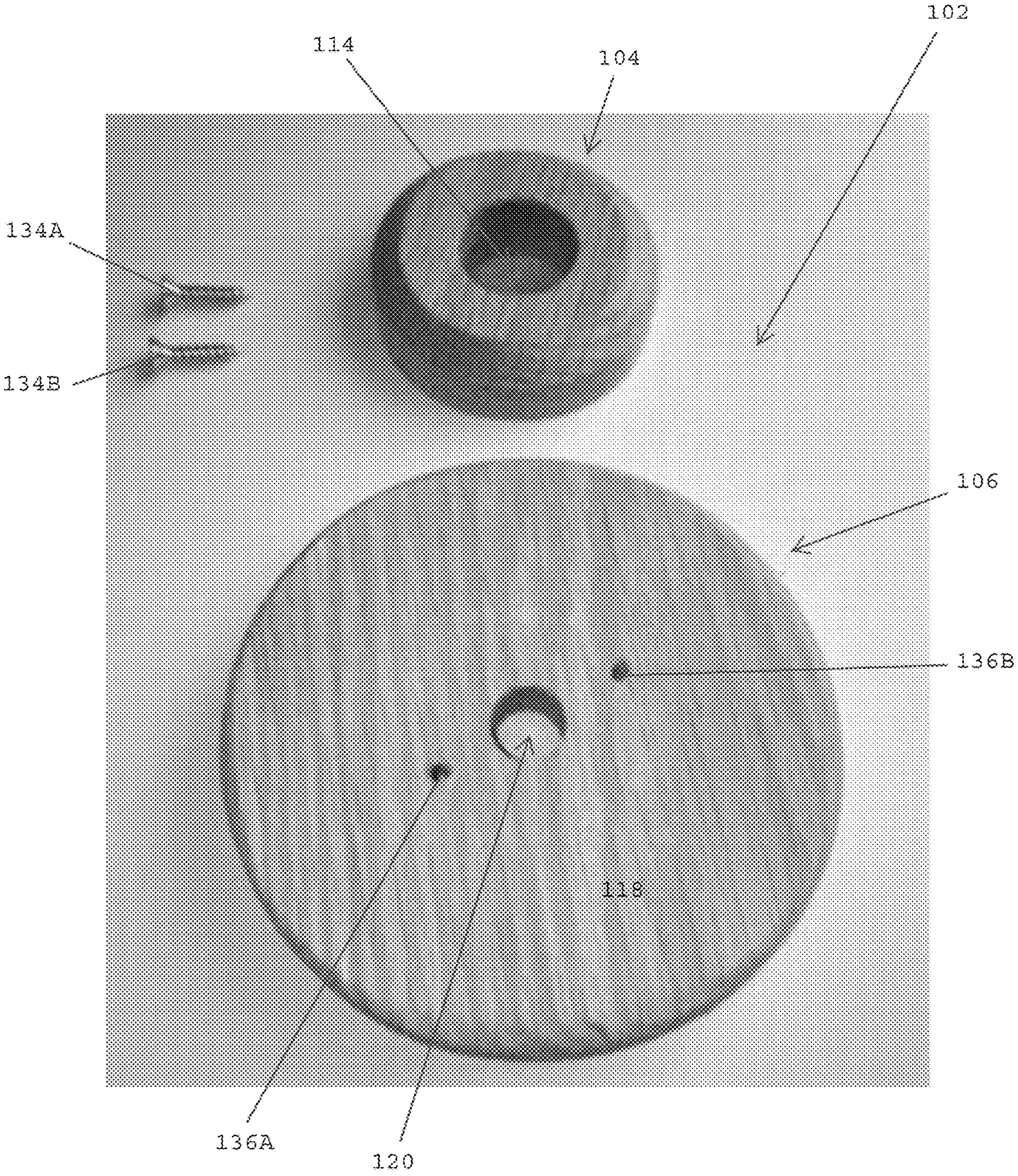
FIG. 6 is an exploded, top side view of a cocktail smoking chimney including a chimney stack, a sealing base, and fastening elements that are used to secure the chimney stack to the sealing base, in accordance with one embodiment of the present patent application.

Referring to FIG. 6, in one embodiment, the cocktail smoking chimney 102 preferably includes the chimney stack 104, the sealing base 106, and fastening elements 134A, 134B that may be used for securing the chimney stack 104 over a top major surface 118 of the sealing base 106. In one embodiment, the fastening elements 134A, 1348 may be used for releasably securing the chimney stack 104 to the sealing base 106.

In one embodiment, the chimney stack 104 includes a central opening 114, hereinafter referred to as a chimney stack central opening, that extends from an upper end to a lower end of the chimney stack 104. The chimney stack central opening 114 desirably defines a combustion chamber for the chimney stack. In one embodiment, combustible material may be placed inside the combustion chamber of the chimney stack. The combustible material may be ignited and burned for generating smoke that is directed through the smoke transfer opening 120 of the sealing base 106 for being infused into a drink.

In one embodiment, the sealing base 106 desirably includes the smoke transfer opening 120 that extends from the top major surface 118 to the bottom major surface 122 (FIG. 5) of the sealing base 106.

In one embodiment, when the chimney stack 104 is assembled over the top major surface 118 of the sealing base 106, the respective openings 114 and 120 of the chimney stack and the sealing base are aligned with one another. The aligned openings preferably enable smoke to pass from the combustion chamber of the chimney stack and through the sealing base for teaching an underside of the sealing base.

In one embodiment, the sealing base 106 preferably has a first fastener opening 136A, and a second fastener opening 136B that pass through the thickness of the sealing base 106. The first and second fastener openings 136A, 136B enable the fastening elements 134A, 134B to pass through the sealing base 106 for securing the chimney stack 104 to the top side of the sealing base 106, as will be described in more detail herein.

Figure 7:
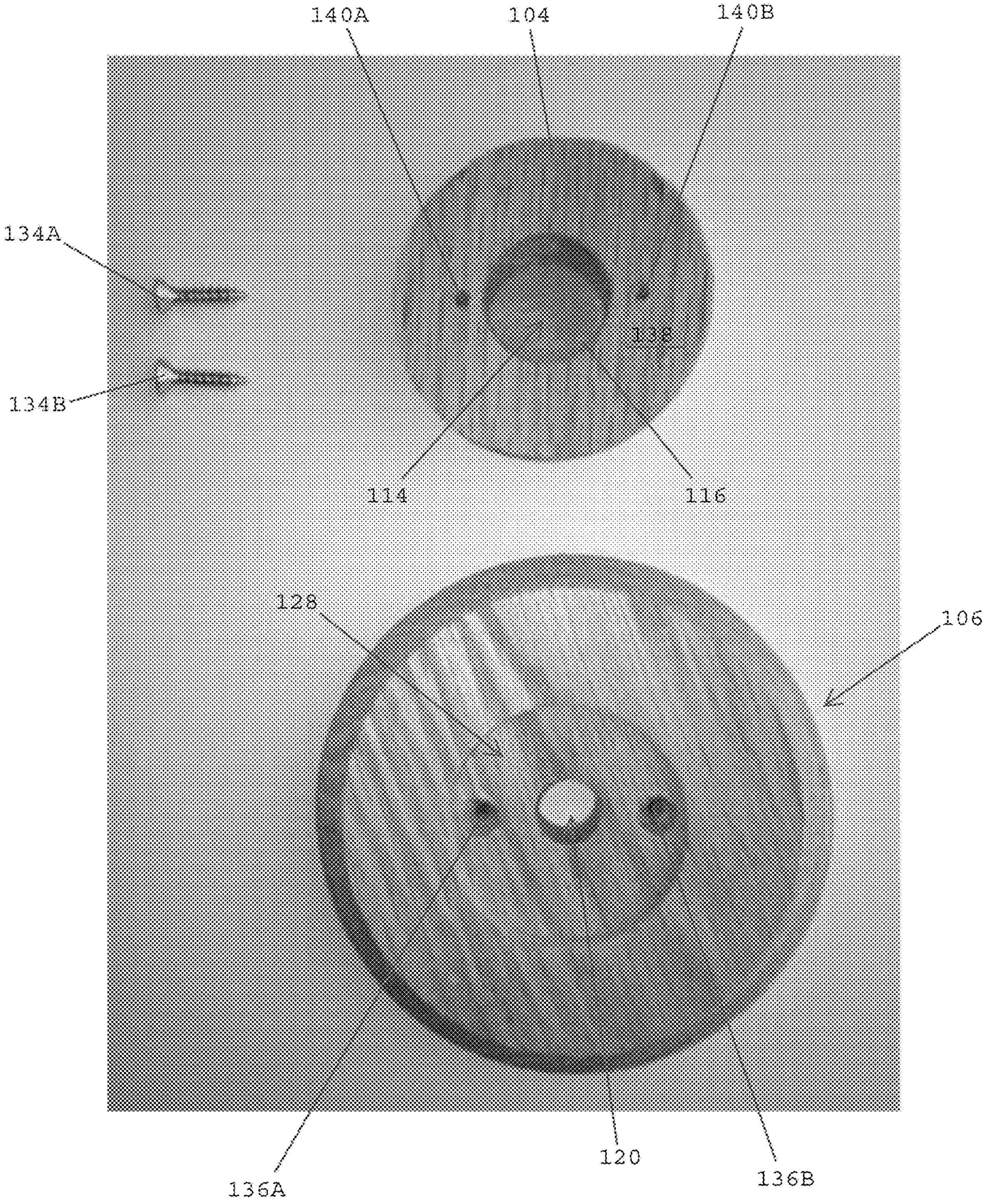
FIG. 7 is an exploded, bottom side view of the chimney stack, the sealing base, and the fastening elements shown in FIG. 6.

Referring to FIG. 7, in one embodiment, the chimney stack 104 has a bottom major surface 138 that is adapted to engage the top major surface 118 (FIG. 6) of the sealing base 106. In one embodiment, first and second fastener openings 140A, 140B are formed in the bottom major surface 138 of the chimney stack 104. The first and second fastener openings 140A, 140B are adapted to receive the first and second fasteners 134A, 134B for securing the chimney stack 104 to the topside of the sealing base 106.

In one embodiment, when the chimney stack 104 is positioned over the top major surface 118 (FIG. 6) of the sealing base 106, the fastener openings 140A, 140B of the chimney stack 104 are preferably aligned with the fastener openings 136A, 136B that pass through the sealing base 106. With the chimney stack 104 assembled atop the sealing base 106, the first fastening element 134A is desirably passed in the series through the first fastener opening 136A of the sealing base and into the first fastener opening 140A of the chimney stack 104. Similarly, the second fastening element 134B is desirably passed in the series through the second fastener opening 136B of the sealing base 106 and into the second fastener opening 140B of the chimney stack 104. After the chimney stack 104 is secured to the topside of the sealing base 106, the central opening 114 of the chimney stack 104 is preferably aligned with the smoke transfer opening 120 of the sealing base 106. The porous screen 116 is preferably positioned at the lower end of the central opening 114 of the chimney stack 104, adjacent the bottom major surface 138 of the chimney stack 104.

Figure 8:
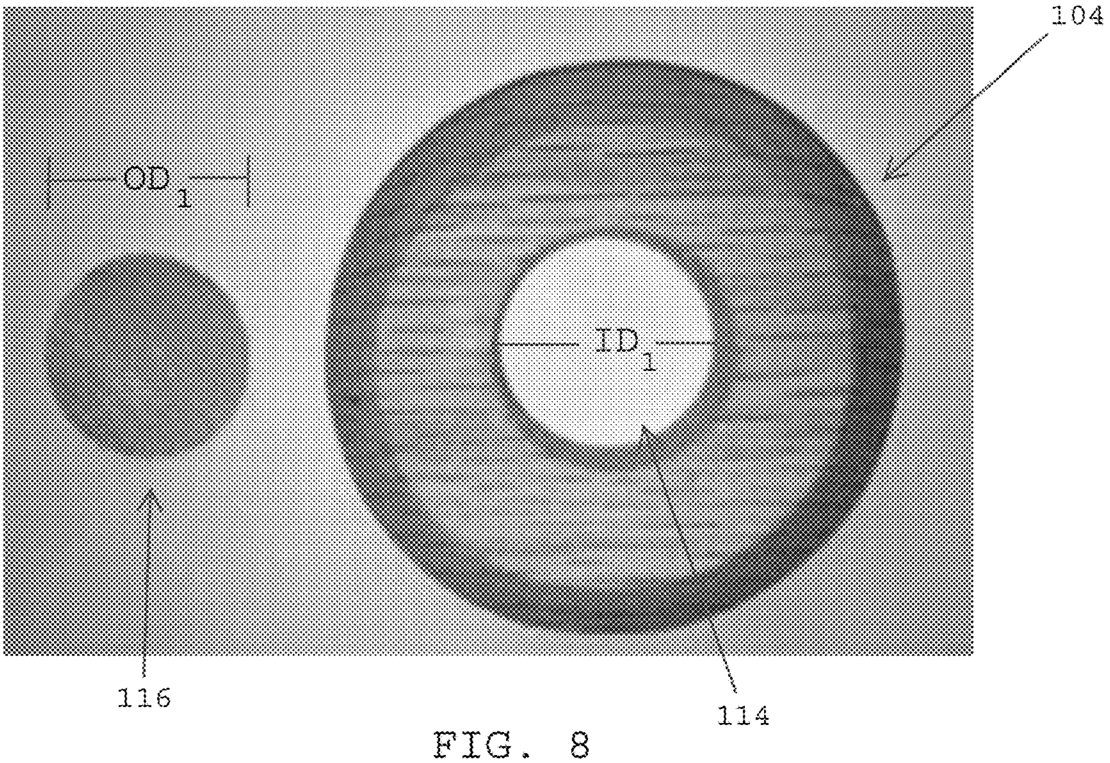
FIG. 8 is an exploded view of a chimney stack and a porous screen that is configured for being disposed inside the chimney stack, in accordance with one embodiment of the present patent application.

Referring to FIG. 8, in one embodiment, the chimney stack 104 is preferably adapted to receive the porous screen 116, which is insertable into the chimney stack central opening 114 of the chimney stack. In one embodiment, the porous screen 116 has an outer diameter $OD_1$ that preferably matches the inner diameter $ID_1$ of the chimney stack central opening 114 of the chimney stack 104. Although the present patent application is not limited by any particular theory of operation, it is believed that matching the outer diameter $OD_1$ of the porous screen 116 with the inner diameter $ID_1$ of the chimney stack central opening 114 will enable the porous screen to be assembled inside the chimney stack, which will prevent the porous screen 116 from being sandwiched between the bottom major surface of the chimney stack 104 and the top major surface of the sealing base 106 (FIG. 6), thereby minimizing the likelihood of an air gap forming between the bottom major surface of the chimney stack 104 and the top major surface of the sealing base 106. Eliminating the formation of a gap between the underside of the chimney stack and the topside of the sealing base will desirably prevent smoke from escaping laterally between the lower end of the chimney stack and the top major surface of the sealing base. As a result, smoke that passes from the chimney stack and through the smoke transfer opening of the sealing base will be directed to flow into a drinking glass, rather than escaping laterally between the lower end of the chimney stack and the top side of the sealing base.

Figure 9A:
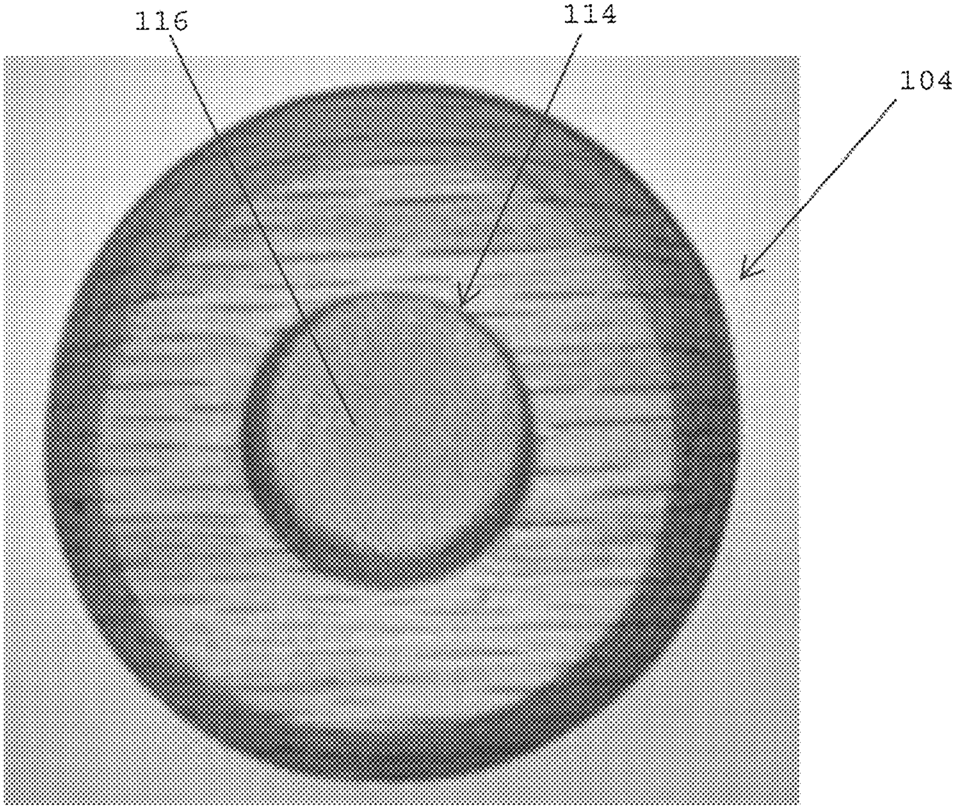
FIG. 9A shows the porous screen of FIG. 8 after the porous screen has been disposed inside chimney stack of FIG. 8, in accordance with one embodiment of the present patent application.

Referring to FIG. 9A, in one embodiment, the porous screen 116 is desirably positioned inside the chimney stack central opening 114 of the chimney stack 104. The porous screen 116 is preferably positioned at a lower end of the chimney stack central opening 114, adjacent the bottom major surface of the chimney stack 104. In one embodiment, the outer perimeter of the porous screen 116 preferably forms a friction fit with the inner diameter of the chimney stack central opening 114.

Figure 9B:
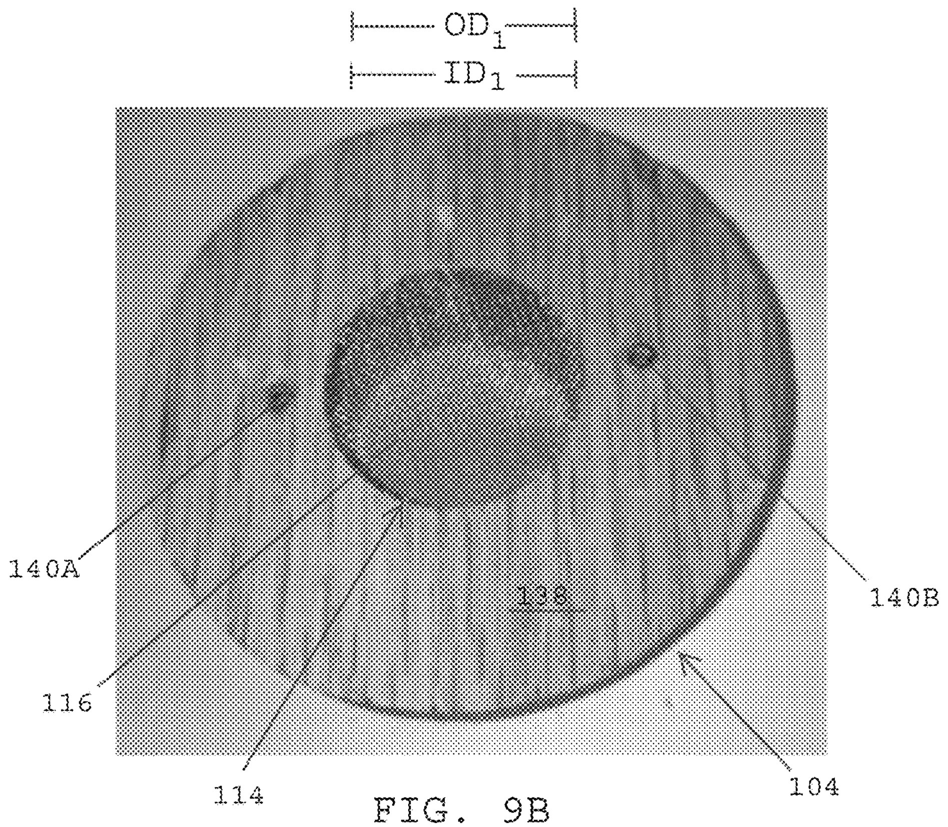
FIG. 9B shows a bottom view of the chimney stack and the porous screen shown in FIG. 9A.

Referring to FIG. 9B, in one embodiment, the porous screen 116 preferably has an outer diameter $OD_1$ that generally matches the inner diameter $ID_1$ of the central opening 114 of the chimney stack 104. The porous screen 116 is desirably positioned adjacent the lower end of the central opening 114, which may be adjacent the bottom major surface 138 of the chimney stack 104.

In one embodiment, first and second fastener openings 140A, 140B are preferably formed in the bottom major surface 138 of the chimney stack 104. The first and second fastener openings 140A, 140B are preferably adapted to receive the respective first and second fastening elements 134A, 134B (FIG. 7) for releasably securing the chimney stack 104 to the sealing base 106 (FIG. 6).

Figure 10:
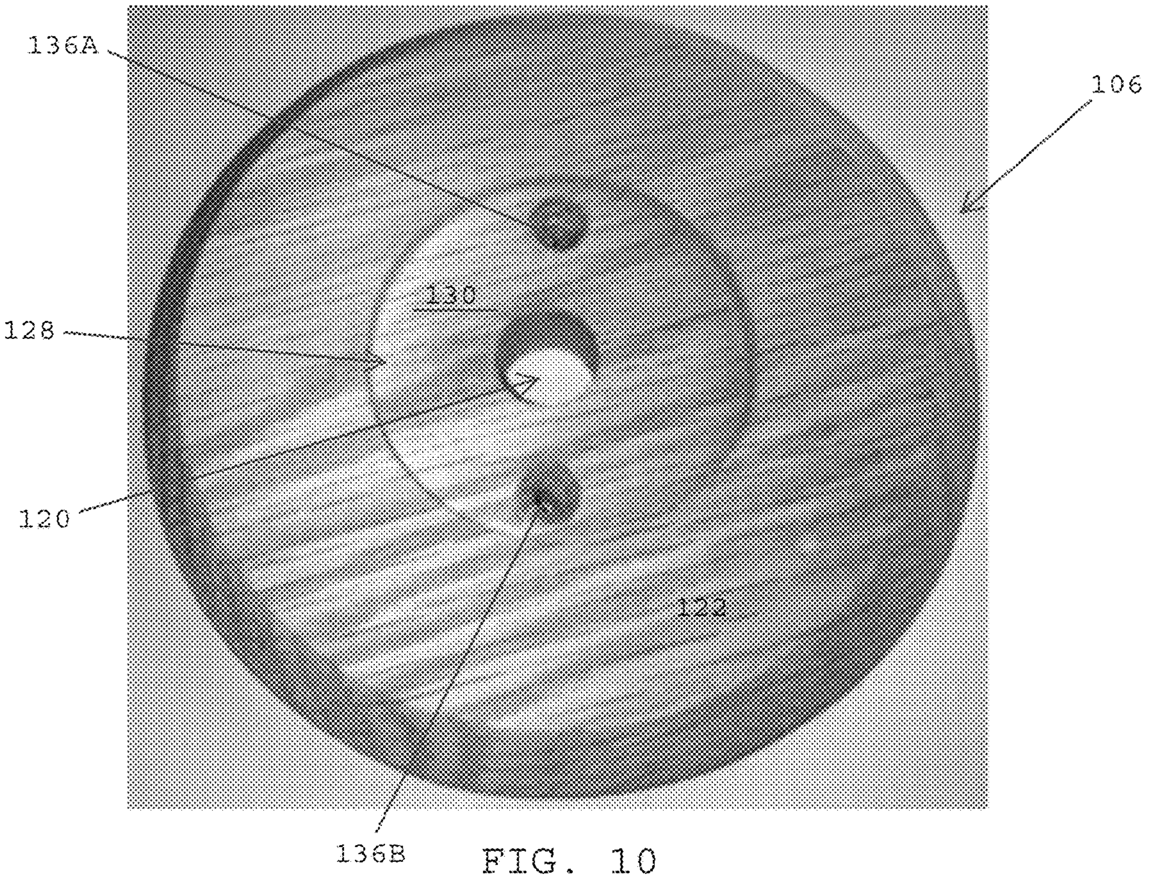
FIG. 10 shows a bottom side view of the sealing base of the cocktail smoking chimney shown in FIG. 3B, in accordance with one embodiment of the present patent application.

Referring to FIG. 10, in one embodiment, the sealing base 106 preferably includes the bottom major surface 122 and the annular depression 128 formed in the bottom major surface 122 to define a recessed surface 130 that surrounds the smoke transfer opening 120 of the sealing base 106. The sealing base 106 preferably includes the first and second fastener openings 136A, 136B that are located inside the outer perimeter of the annular depression 128 and that extend from an underside to a topside of the sealing base 106.

Referring to FIGS. 9B and 10, in one embodiment, when the sealing base 106 is assembled with the chimney stack 104, the smoke transfer opening 120 of the sealing base 106 is preferably aligned with a central opening 114 of the chimney stack 104. In addition, the first and second fastener openings 136A, 136B of the sealing base 106 are preferably aligned with the respective first and second fastener openings 140A, 140B of the chimney stack 104. Fastening elements, such as the fastening elements 134A, 134B shown in FIGS. 6 and 7, may be passed through the aligned fastener openings formed in the sealing base and the chimney stack for securing the chimney stack 104 to a topside of the sealing base 106.

In one embodiment, the cocktail smoking chimneys and kits disclosed herein may incorporate one or more of the features disclosed in commonly owned U.S. patent application Ser. No. 17/158,179, the disclosure of which in hereby incorporated by reference herein.

Figure 11A:
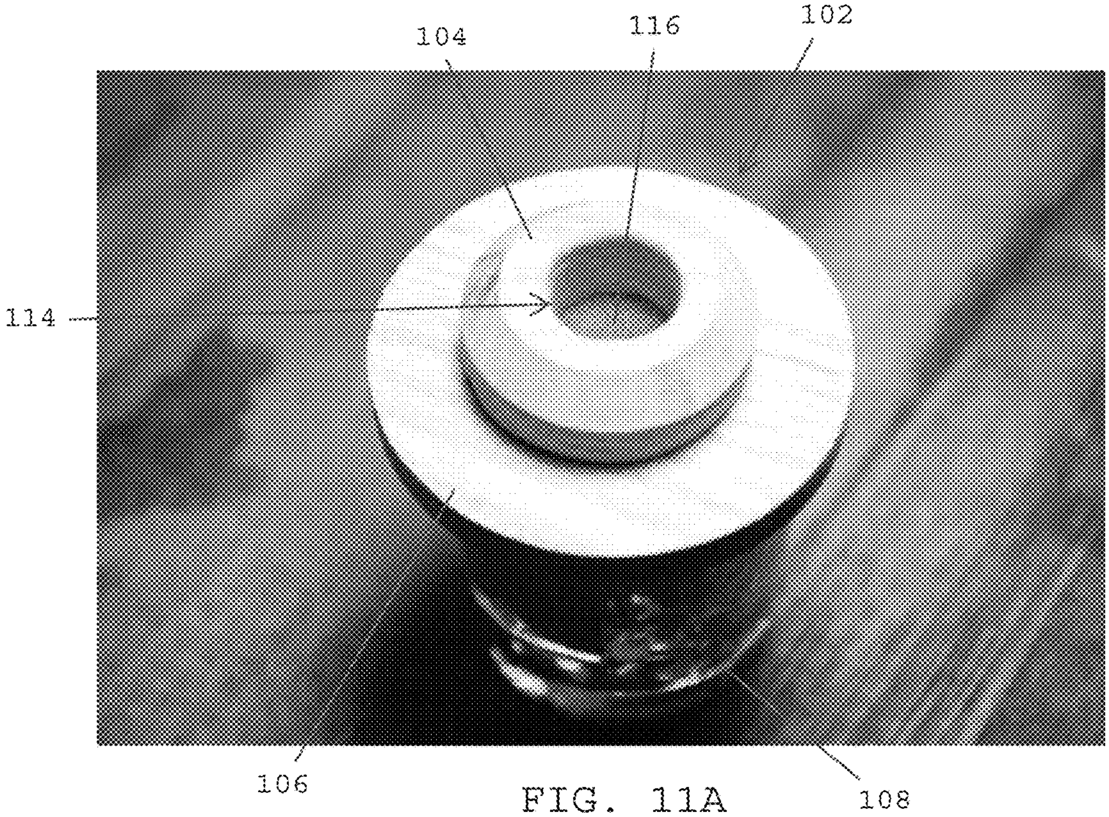
FIG. 11A illustrates a first stage of a method of infusing smoke into a beverage, in accordance with one embodiment of the present application.

Referring to FIG. 11A, in one embodiment, smoke may be infused into a drinking glass 108 by positioning a cocktail smoking chimney 102 atop an open, upper end of the drinking glass 108. In one embodiment, the cocktail smoking chimney 102 includes the chimney stack 104, the sealing base 106, and the porous screen 116 that is disposed inside the central opening 114 of the chimney stack 104. The central opening 114 of the chimney stack 104 and the porous screen 116 preferably define a combustion chamber located inside the chimney stack that is adapted to receive combustible material (e.g., wood chips; wood powder; spices) that may be ignited and burned for generating smoke.

Figure 11B:
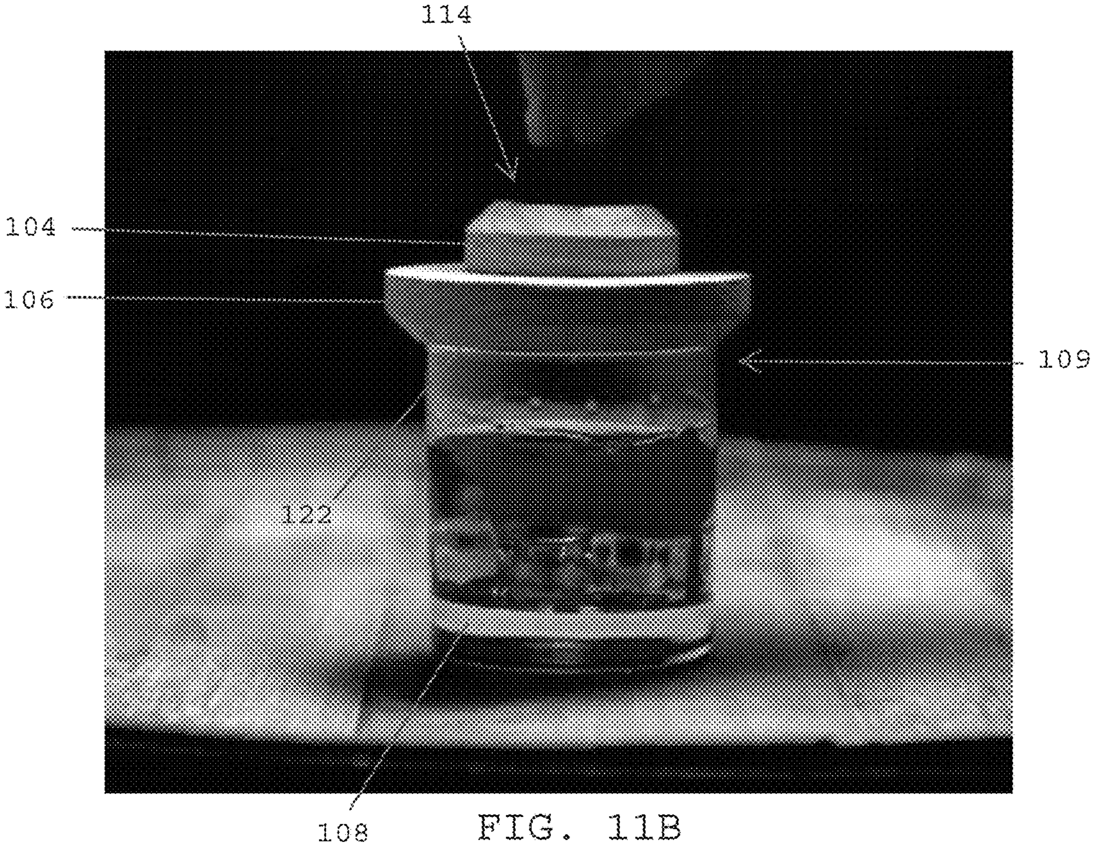
FIG. 11B shows a second stage of a method of infusing smoke into a beverage, in accordance with one embodiment of the present patent application.

Referring to FIG. 11B, in one embodiment, the bottom major surface 122 of the sealing base 106 is preferably positioned atop the rim or open, upper end 109 of the drinking glass 108 for forming an air-tight seal between the underside of the sealing base and the rim or open, upper end 109 of the drinking glass 108. In one embodiment, combustible material may be placed inside the central opening 114 (FIG. 11A) of the chimney stack 104.

Figure 11C:
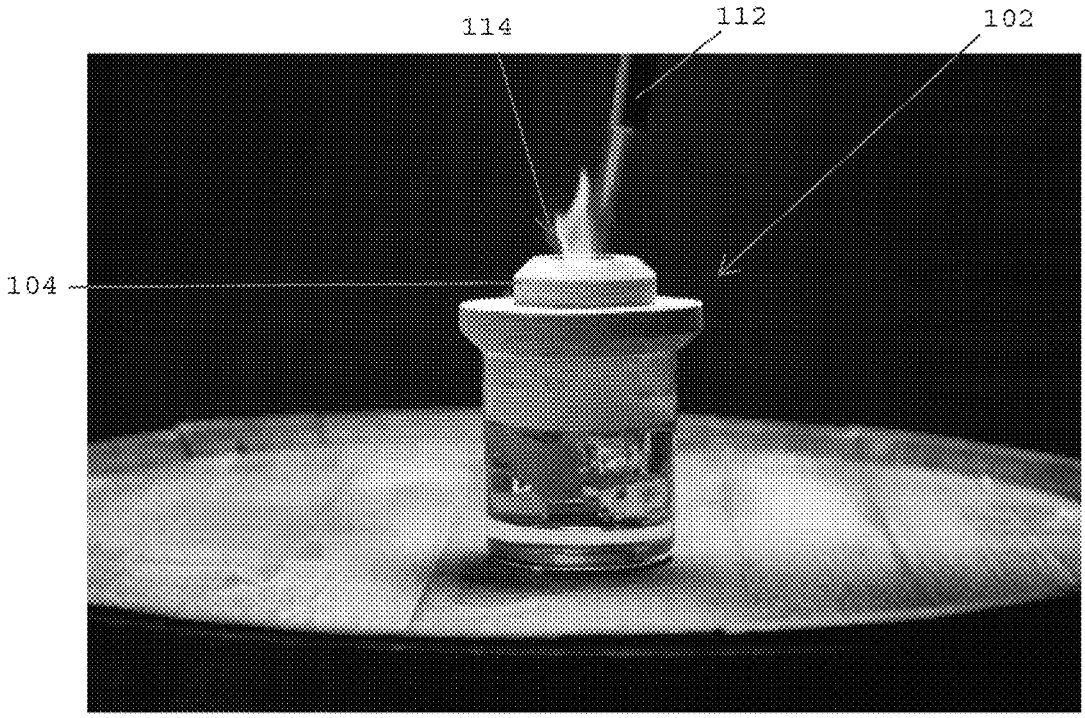
FIG. 11C shows a third stage of a method of infusing smoke into a beverage, in accordance with one embodiment of the present patent application.

Referring to FIG. 11C, in one embodiment, the lighter 112 (e.g., a butane torch) is preferably utilized for directing a flame into the combustion chamber 114 of the chimney stack 104 for burning the combustible material that has been packed inside the cocktail smoking chimney 102.

Figure 11D:
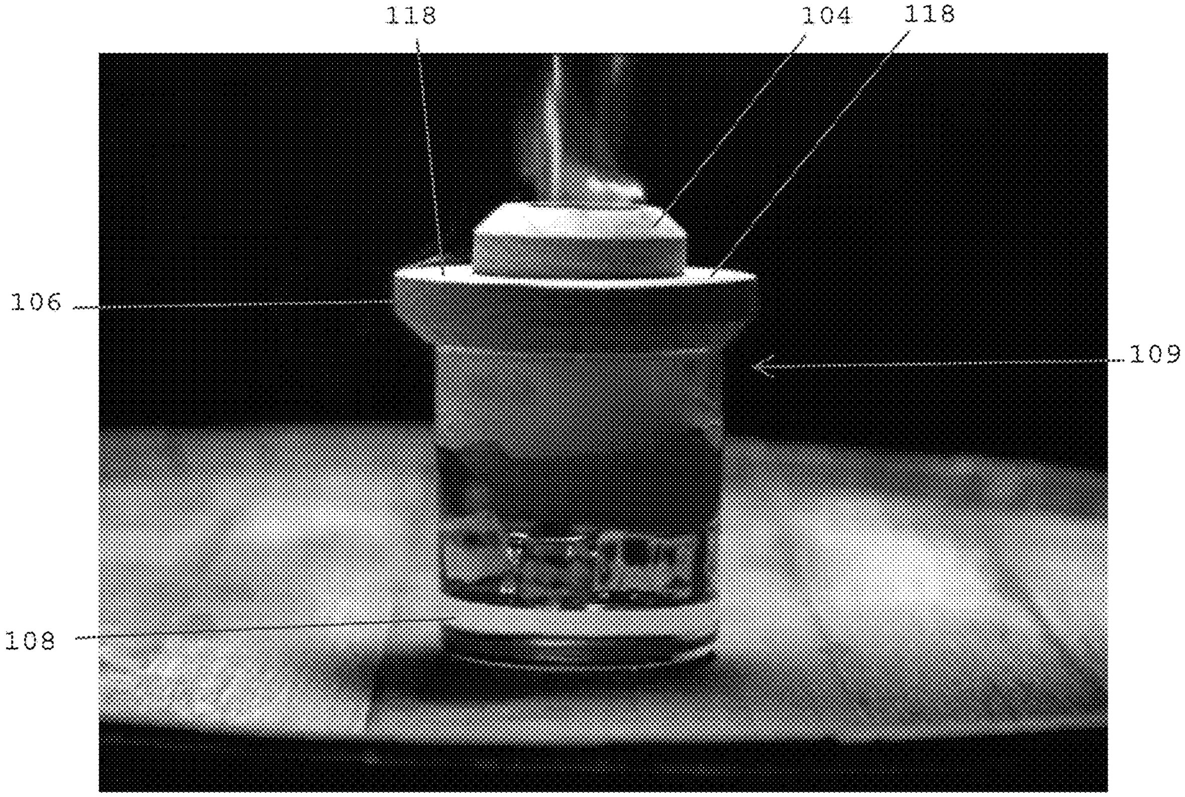
FIG. 11D shows a fourth stage of a method of infusing smoke into a beverage, in accordance with one embodiment of the present patent application.

Referring to FIG. 11D, in one embodiment, the combustible material inside the combustion chamber 114 of the chimney stack 104 continues to burn for generating smoke that preferably passes through the aligned central openings of the chimney stack 104 and the sealing base 106 for directing smoke into the drink that has been previously poured into the drinking glass 108. The underside of the sealing base 106 preferably forms a seal with the open, upper end 109 of the drinking glass 106 for preventing any smoke from escaping outside of the drinking glass. The bottom major surface of the chimney stack 104 is preferably flush with the top major surface 118 of the sealing base 106 for preventing any smoke from escaping laterally between the lower end of the chimney stack 104 and the top surface 118 of the sealing base 106.

Figure 11E:
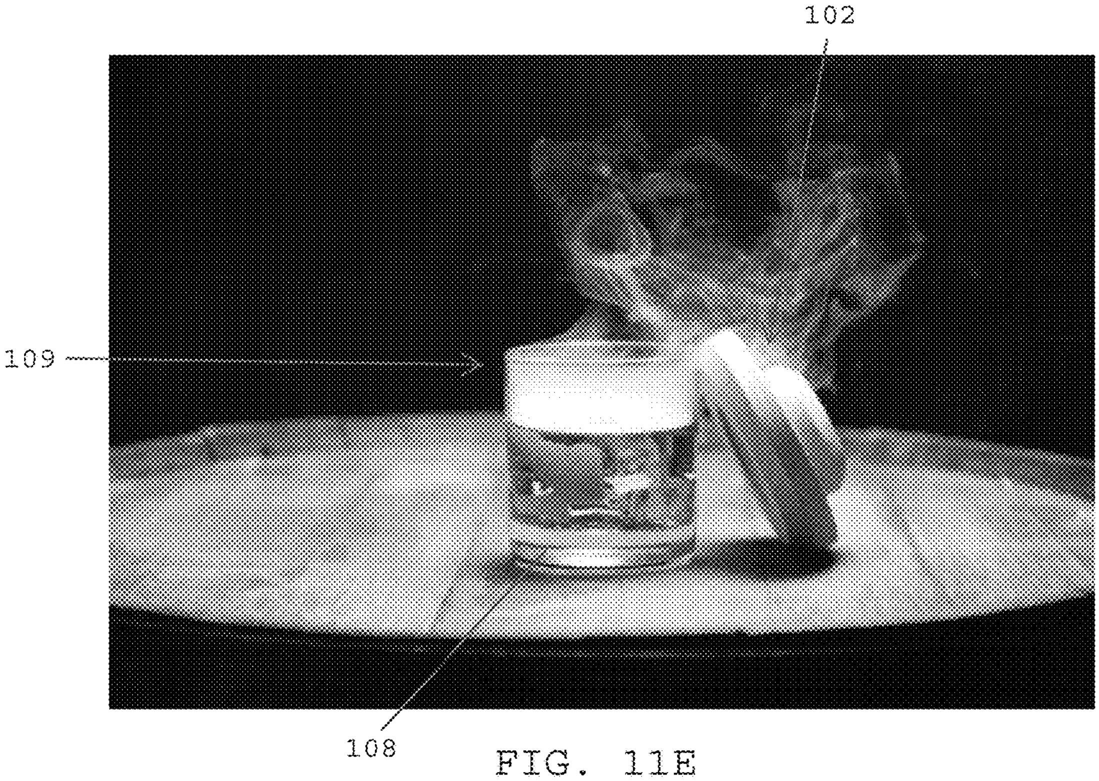
FIG. 11E shows a fifth stage of a method of infusing smoke into a beverage, in accordance with one embodiment of the present patent application.

Referring to FIG. 11E, in one embodiment, after smoke has been infused into the beverage that is disposed within the drinking glass 108, the cocktail smoking chimney 102 may be removed from the rim or the open, upper end 109 top of the drinking glass 108. The beverage that has been infused with smoke may be served to an individual.

Figure 12:
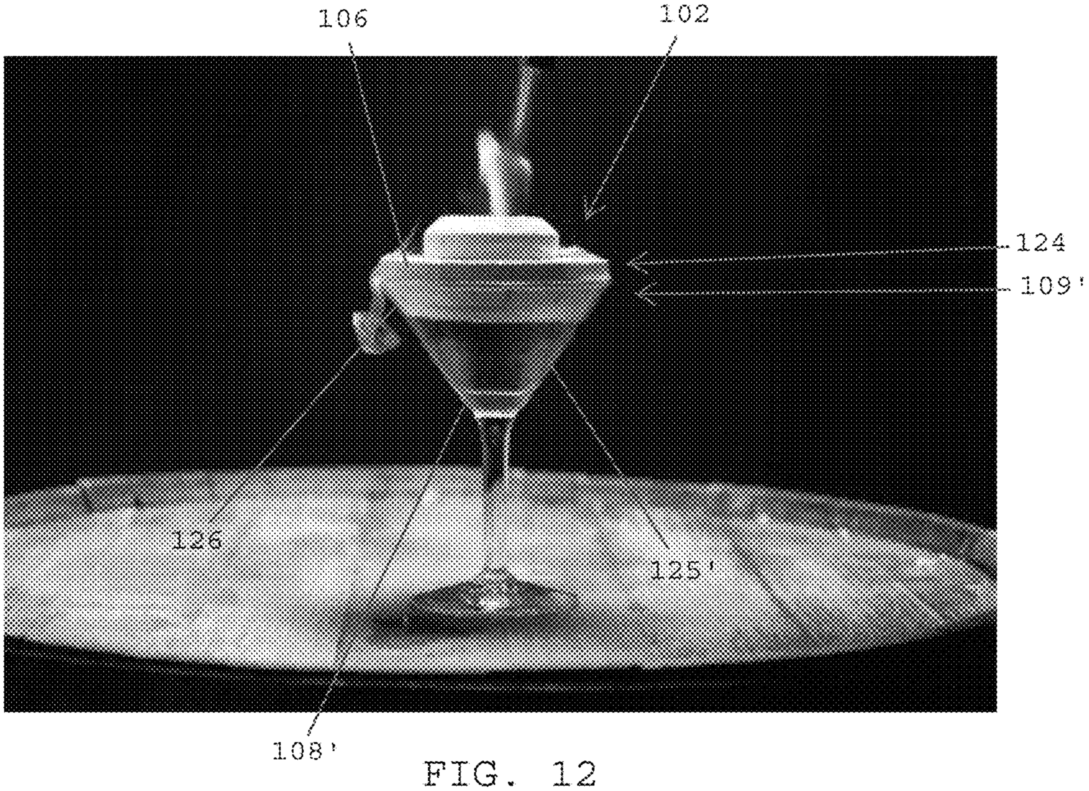
FIG. 12 is a side view of a cocktail glass and a cocktail smoking chimney positioned inside an open upper end of the cocktail glass, in accordance with one embodiment of the present patent application.

Referring to FIG. 12, in one embodiment, the cocktail smoking chimney 102 may be utilized with drinking glasses 108' having various shapes (e.g., martini glasses with sloping walls). In FIG. 12, the drinking glass 108' is a martini glass having sloping surfaces 125'. The sloping surface 126 (FIG. 5) at the outer perimeter 124 of the sealing base 106 preferably forms a seal with the inner surface of the sloping surface 125' of the drinking glass 108' to prevent any smoke from escaping between the underside of the sealing base 106 and the open, upper end 109' of the drinking glass 108'.

Figure 13A:
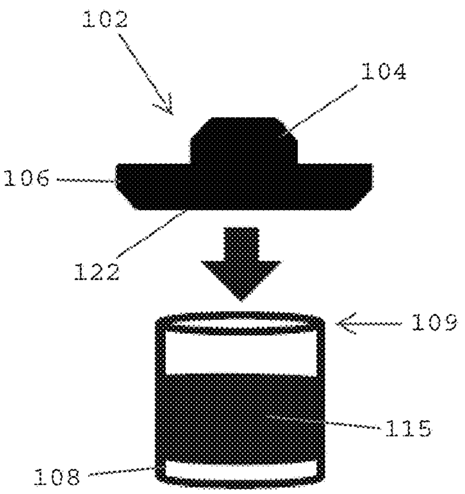
FIG. 13A shows a first stage of a method of infusing smoke into a cocktail, in accordance with one embodiment of the present patent application.

Referring to FIG. 13A, in one embodiment, a drinking glass 108 contains a beverage 115, such as a cocktail or an alcoholic drink. A cocktail smoking chimney 102 as disclosed herein is preferably positioned over an open, upper end 109 of the drinking glass 108. The bottom major surface 122 of the sealing base 106 is preferably aligned with and seals the opening at the open, upper end 109 of the drinking glass 108. The chimney stack 104 may be grasped for positioning the cocktail smoking chimney 102 atop the rim of the drinking glass 108.

Figure 13B:
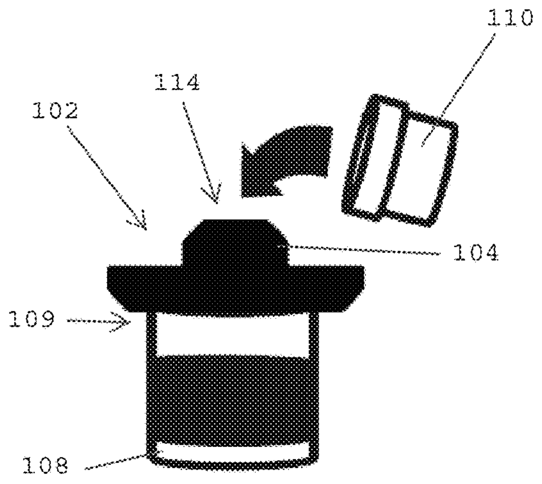
FIG. 13B shows a second stage of a method of infusing smoke into a cocktail, in accordance with one embodiment of the present patent application.

Referring to FIG. 13B, after the cocktail smoking chimney 102 has been positioned atop the open, upper end 109 of the drinking glass 108, a combustible material (e.g., wood chips; wood powder; spices) that is stored within a container 110 may be poured into the combustion chamber 114 of the chimney stack 104.

In one embodiment, the wood chips and wood powder may include one or more of the following wood types: apple, hickory, pecan, maple, cherry, and oak. In one embodiment, the wood chips and/or wood powder may include barrel-aged wood or mesquite infused wood.

In one embodiment, the spices that are burned inside the combustion chamber may include cinnamon, rosemary, and chai.

Figure 13C:
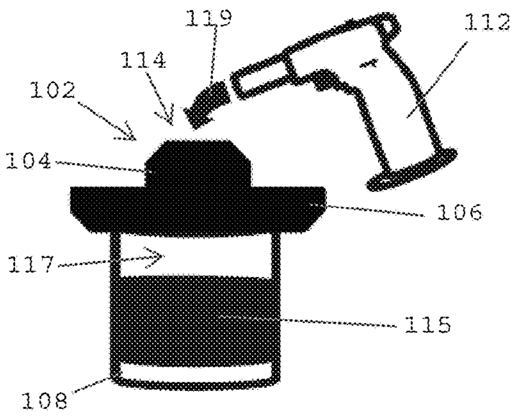
FIG. 13C shows a third stage of a method of infusing smoke into a cocktail, in accordance with one embodiment of the present patent application.

Referring to FIG. 13C, in one embodiment, a lighter 112 (e.g., a butene torch) may be activated for generating a flame 119 that is directed into the combustion chamber 114 of the chimney stack 104 of the cocktail smoking chimney 102. The flame 119 preferably ignites the combustible material that has been disposed inside the combustion chamber 114 to generate smoke that may be directed into a sealed area 117 located between an underside of the sealing base 106 and the beverage 115 that has been poured into the drinking glass 108.

Figure 13D:
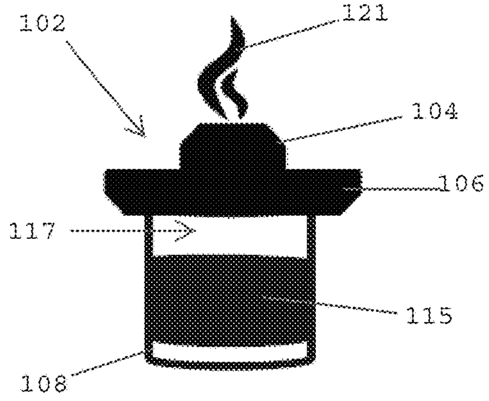
FIG. 13D shows a fourth stage of a method of infusing smoke into a cocktail, in accordance with one embodiment of the present patent application.

Referring to FIG. 13D, in one embodiment, after the combustible material has been ignited, the combustible material will preferably burn to generate smoke 121, which desirably passes through the aligned openings of the chimney stack 104 and the sealing base 106, and into a sealed area 117 that is located inside the drinking glass 108.

The smoke 121 preferably passes through the smoke transfer opening of the sealing base for infusing the smoke into the beverage 115. In one embodiment, when smoking, the cocktail smoking chimney 102 may be left atop the drinking glass 108 for up to two minutes and more preferably about 30-60 seconds.

Figure 13E:
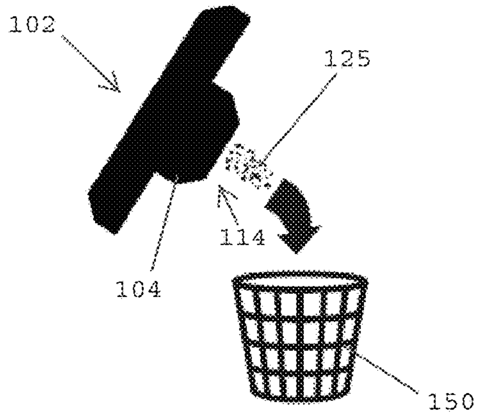
FIG. 13E shows a fifth stage of a method of infusing smoke into a cocktail, in accordance with one embodiment of the present patent application.

Referring to FIG. 13E, in one embodiment, after a sufficient volume of smoke has been infused into the beverage, the cocktail smoking chimney 102 may be lifted away from the open, upper end of the drinking glass and inverted for dumping ash 125 from the combustion chamber 114 of the chimney stack 104. In one embodiment, the ash 125 is preferably dumped into a fire-proof container 150.

Figure 13F:
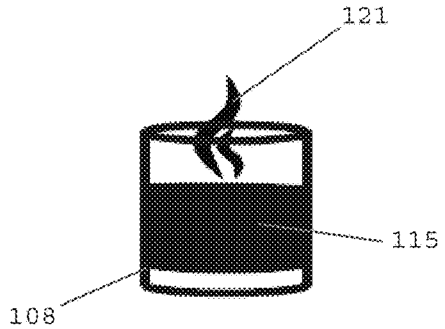
FIG. 13F shows a sixth stage of a method of infusing smoke into a cocktail, in accordance with one embodiment of the present patent applications.

Referring to FIG. 13F, in one embodiment, the smoke infused beverage 115 that is disposed within the drinking glass 108 may be served to an individual.

Figure 14A:
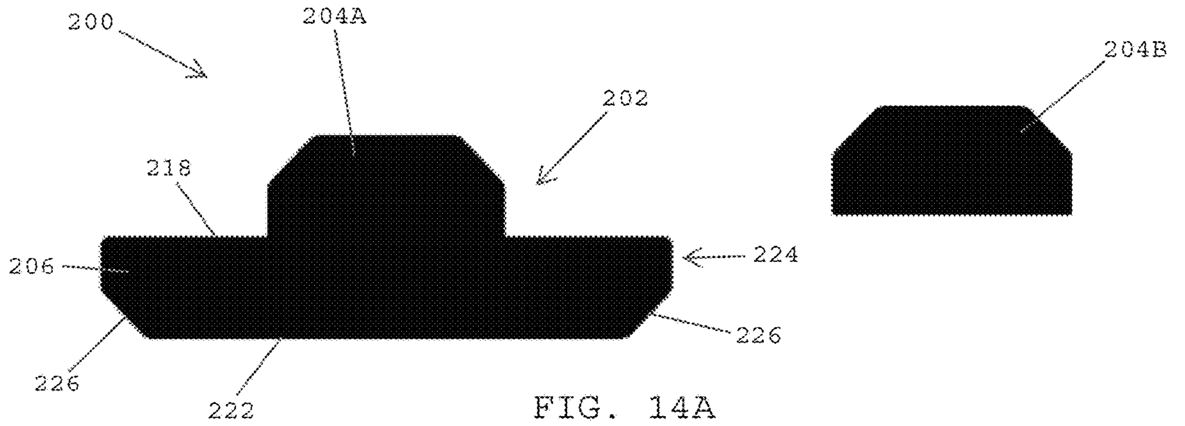
FIG. 14A illustrates a first stage of a method of changing a chimney stack of a cocktail smoking chimney, in accordance with one embodiment of the present patent application.

Referring to FIG. 14A, in one embodiment, a cocktail smoking kit 200 preferably includes at least one cocktail smoking chimney 202 having a first chimney stack 204A that is releasably secured to a sealing base 206, and a second chimney stack 204B that may be used as a replacement part to replace the first chimney stack 204A. In one embodiment, the first and second chimney stacks 204A, 204B preferably have the same structural features as the chimney stack 104 shown and described herein in FIGS. 6-9B.

In one embodiment, the sealing base 206 preferably includes a top major surface 218 and a bottom major surface 222. The sealing base 206 preferably has an outer perimeter 224 and a sloping surface 226 that is adjacent the outer perimeter 224 for enabling the underside of the sealing base 206 to form an airtight seal with a sloping surface of a drinking glass, such as a martini glass having a sloping outer edge.

In one embodiment, to assemble the first chimney stack 204A with the sealing base 206, the bottom major surface of the first chimney stack 204A is abutted against the top major surface 218 of the sealing base 206. In one embodiment, the opposing major surfaces of the respective first chimney stack and the sealing base are substantially flat for forming an air-tight seal between the lower end of the first chimney stack 204A and the top major surface 218 of the sealing base 206.

In one embodiment, after the first chimney stack 204A is assembled over the sealing base 206, the fastening elements 134A, 134B (FIG. 6) may be passed through the respective fastener openings formed in the sealing base 206 and the first chimney stack 204A.

Figure 14B:
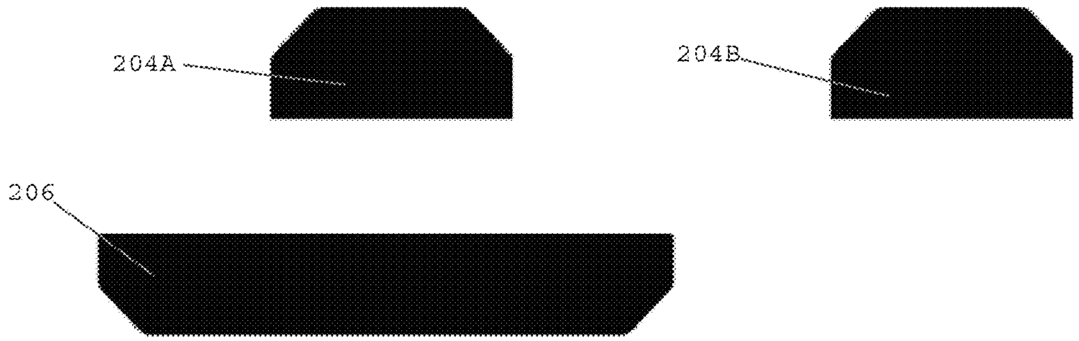
FIG. 14B illustrates a second stage of a method of changing a chimney stack of a cocktail smoking chimney, in accordance with one embodiment of the present patent application.

Referring to FIGS. 14A and 14B, in one embodiment, only one of the first and second chimney stacks 204A, 204B may be assembled with the sealing base 206 at any one time. In one embodiment, the first and second chimney stacks 204A, 204B may be made of different materials that generate a different type of smoke (e.g., a different smoke flavor). For example, in one embodiment, the first chimney stack 204A may be made of oak wood and the second chimney stack 204B may be made of cherry wood. In one embodiment, the first chimney stack 204A may be utilized until wear and tear requires that it be replaced by the second chimney stack 204B. Thus, the kit 200 for infusing smoke may include replacement parts for replacing worn-out components of a smoke infusing system.

Figure 14C:
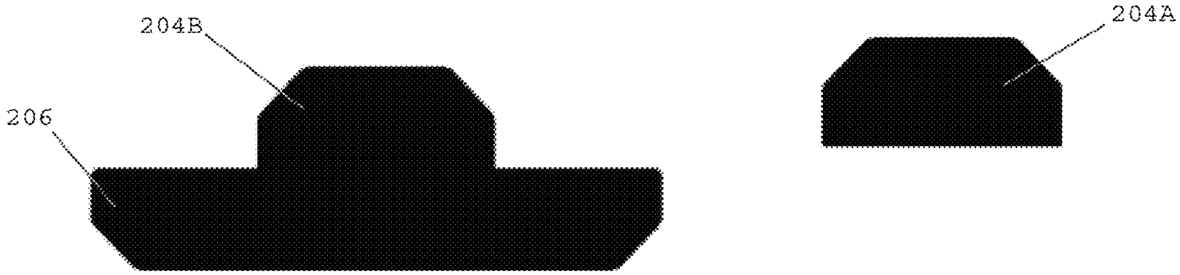
FIG. 14C illustrates a third stage of a method of changing a chimney stack of a cocktail smoking chimney, in accordance with one embodiment of the present patent application.

Referring to FIGS. 14B and 14C, in one embodiment, after the first chimney stack 204A has been disassembled from the sealing base 206, the second chimney stack 204B may be assembled with the sealing base. In one embodiment, the first and second fasteners 134A, 134B (FIG. 7) are removed for enabling the first chimney stack 204A to be disassembled and replaced with the second chimney stack 204B. Referring to FIG. 14C, in one embodiment, after the second chimney stack 204B has been positioned atop the sealing base 206, the first and second fastening elements 134A, 134B (FIG. 7) are preferably passed through the aligned fastener openings of the sealing base 206 and the second chimney stack 204B for securing the second chimney stack 204B atop the sealing base 206.

Figure 14D:
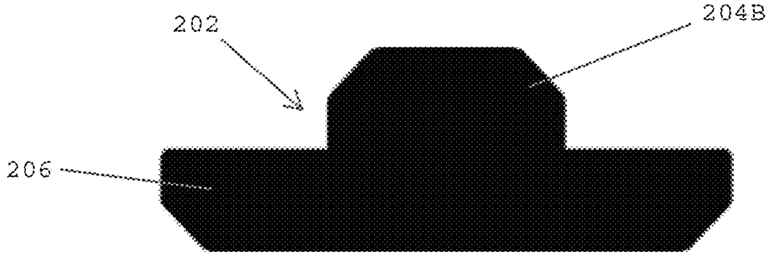
FIG. 14D illustrates a fourth stage of a method of changing a chimney stack of a cocktail smoking chimney, in accordance with one embodiment of the present patent application.

FIG. 14D shows the cocktail smoking chimney 202 with the replacement second chimney stack 204B secured atop the sealing base 206. If it is still in serviceable condition, the first chimney stack 204A (FIG. 14C) may be stored for future use. If the first chimney stack is no longer suitable for use, the first chimney stack may be discarded.

In one embodiment, a system for infusing smoke into drinks may include a kit 300 that has two or more chimney stacks having different dimensions. For example, a first chimney stack may be shorter, and a second chimney stack may be taller. In one embodiment, the height of a chimney stack may impact how (e.g., a flow pattern) smoke is infused into a beverage.

Figure 15A:
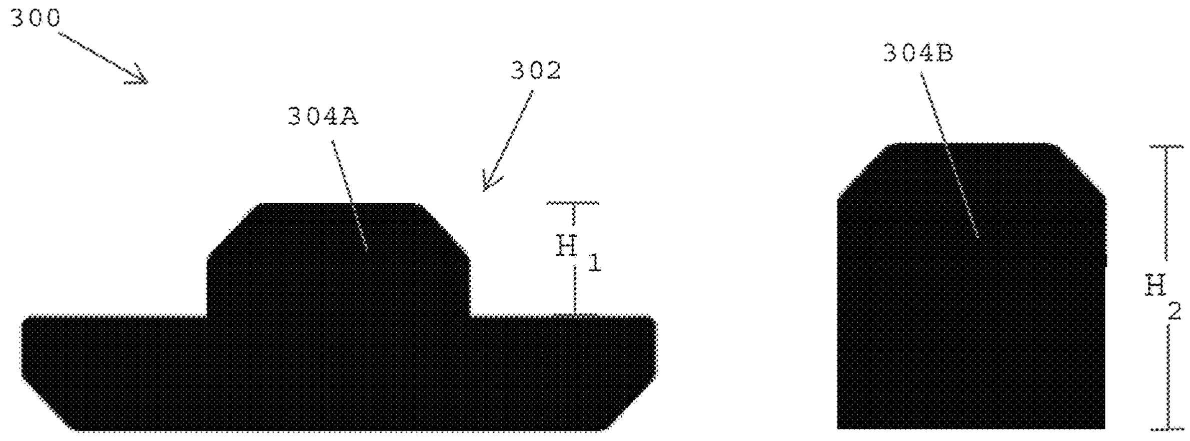
FIG. 15A illustrates a first stage of a method of changing a chimney stack of a cocktail smoking chimney, in accordance with one embodiment of the present patent application.

Referring to FIG. 15A, in one embodiment, a kit 300 for infusing smoke into beverages preferably includes a cocktail smoking chimney 302 having a first chimney stack 304A having a first dimension and a second chimney stack 304B having a second dimension that is different than the first dimension of the first chimney stack 304A. In one embodiment, the first chimney stack 304A has a first height $H_1$ and the second chimney stack 304B has a second height $H_2$ that is greater (e.g., taller) than the first height $H_1$. In one embodiment, the different dimensions for the first and second chimney stacks 304A, 304B result in the formation of different properties for the smoke that is infused into beverages.

Figure 15B:
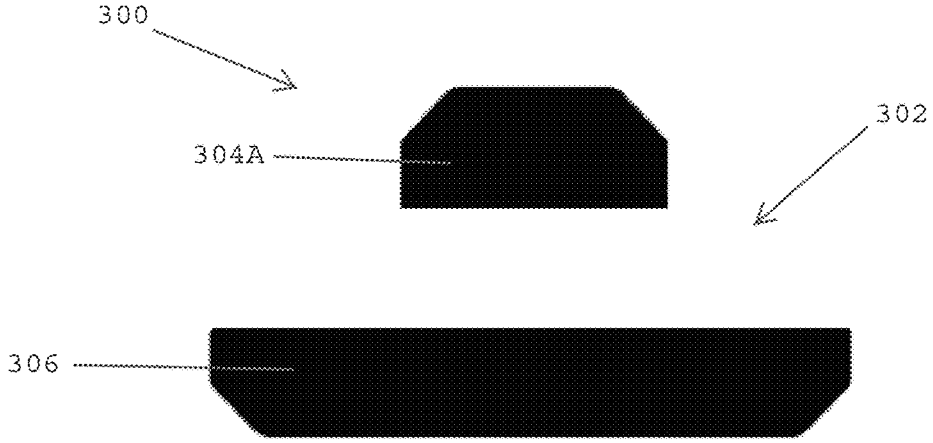
FIG. 15B illustrates a second stage of a method of changing a chimney stack of a cocktail smoking chimney, in accordance with one embodiment of the present patent application.

Referring to FIGS. 15A and 15B, in one embodiment, the first chimney stack 304A having the first height $H_1$ is disassembled from the sealing base 306, whereupon it can be replaced by the second chimney stack 304B having the second height $H_2$.

Figure 15C:
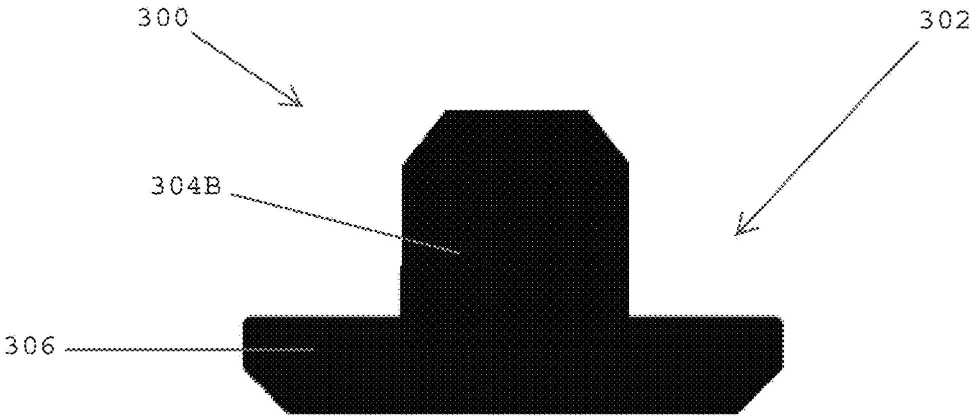
FIG. 15C illustrates a third stage of a method of changing a chimney stack of a cocktail smoking chimney, in accordance with one embodiment of the present patent application.

Referring to FIGS. 15A-15C, in one embodiment, the second chimneys stack 304B replaces the first chimney stack 304A. The second chimney stack 304B is preferably secured to the sealing base 306 of the cocktail smoking chimney 302. The first and second fastening elements 134A, 134B shown and described above in FIGS. 6 and 7 may be utilized for assembling the second chimney stack with the sealing base. Thus, in one embodiment, the kit 300 may contain chimney stacks having different sizes for modifying how the smoke is generated and infused into a drinking glass that contains a beverage (e.g., a cocktail; an alcoholic drink).

Figure 16:
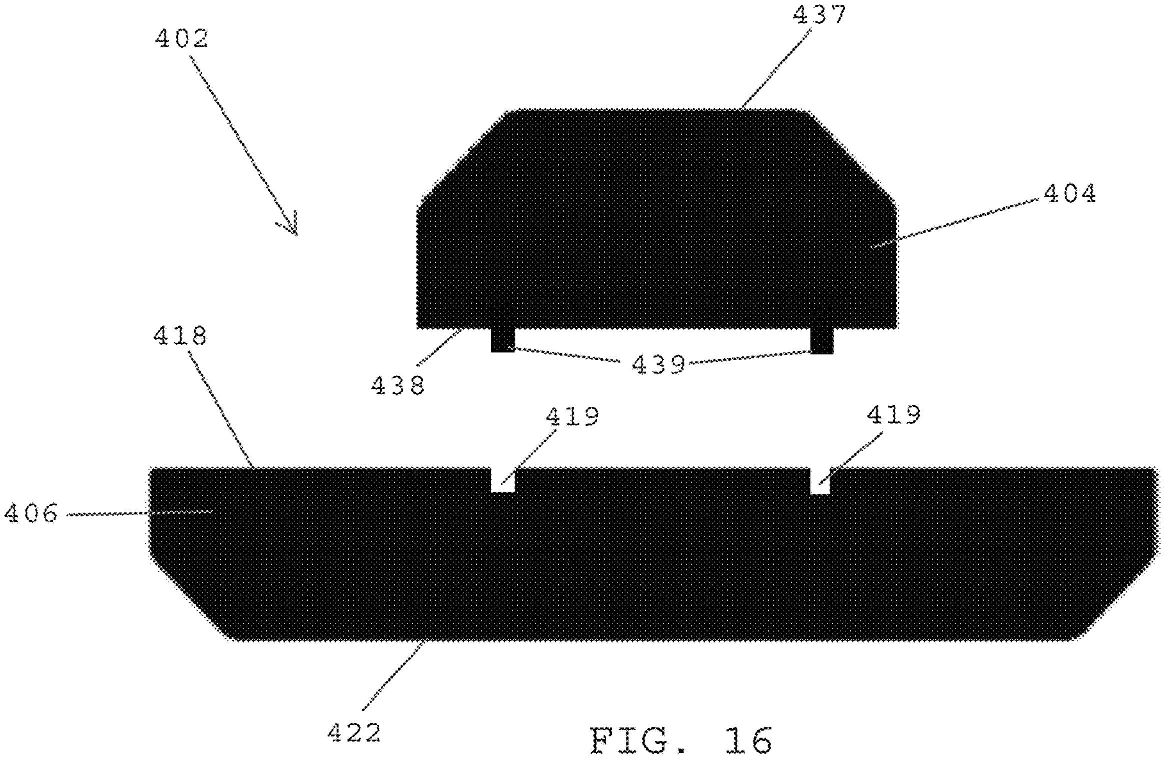
FIG. 16 is an exploded view of a cocktail smoking chimney having a chimney stack and a sealing base that are configured for being joined together by a tongue-in-groove assembly, in accordance with one embodiment of the present patent application.

Referring to FIG. 16, in one embodiment, a cocktail smoking chimney 402 used for infusing smoke into a beverage preferably includes a chimney stack 404 having a top major surface 437, a bottom major surface 438, and a male projection 439 (e.g., an annular ring) that extends from the bottom major surface 438 of the chimney stack 404.

In one embodiment, the cocktail smoking chimney 402 beverage preferably includes a sealing base 406 having a top major surface 418 and a bottom major surface 422. In one embodiment, the top major surface 418 of the sealing base desirably has a female groove 419 (e.g., an annular groove) formed in the top major surface 418.

In one embodiment, the chimney stack 404 and the sealing base 406 may be assembled by inserting the male projection 439 of the chimney stack 404 into the female groove 419 of the sealing base 406. The male projection 439 and the female groove 419 may form a friction fit for holding the chimney stack and the sealing base together.

In one embodiment, the tongue-in-groove structure of the male projection 439 and the female groove 419 preferably prevents smoke from escaping laterally between the bottom major surface 438 of the chimney stack 404 and the top major surface 418 of the sealing base 406.

Figure 17:
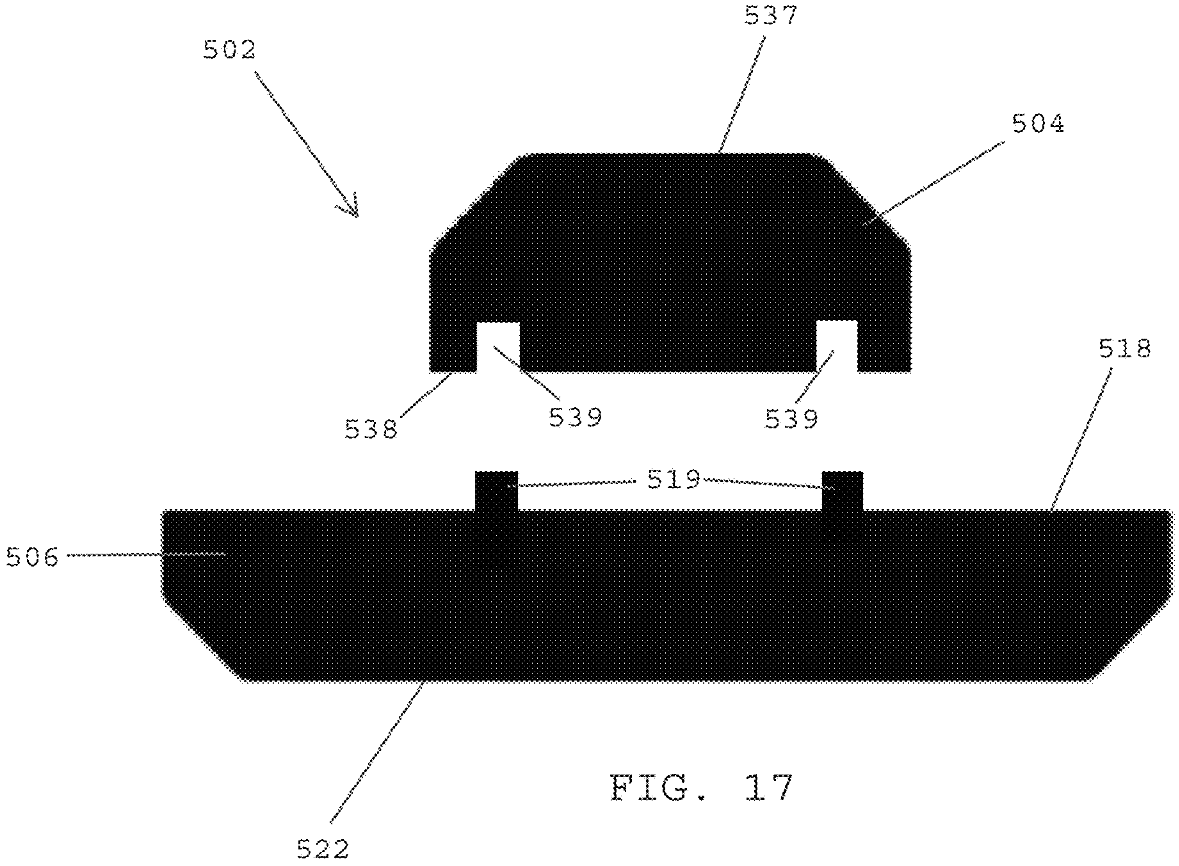
FIG. 17 is an exploded view of a cocktail smoking chimney having a chimney stack and a sealing base that are configured for being joined together by a tongue-in-groove assembly, in accordance with one embodiment of the present patent application.

Referring to FIG. 17, in one embodiment, a cocktail smoking chimney 502 used for infusing smoke into a beverage preferably includes a chimney stack 504 having a top major surface 537, a bottom major surface 538, and a female groove 539 (e.g., an annular groove) that is formed in the bottom major surface 438 of the chimney stack 404.

In one embodiment, the cocktail smoking chimney 402 beverage preferably includes a sealing base 506 having a top major surface 518 and a bottom major surface 522. In one embodiment, the top major surface 518 desirably has a male projection 519 (e.g., an annular ring) that extends from the top major surface 518 of the sealing base.

In one embodiment, the chimney stack 504 and the sealing base 506 may be assembled by inserting the male projection 519 of the sealing base 506 into the female groove 539 of the chimney stack 504. The male projection 519 and the female groove 539 may form a friction fit for holding the chimney stack and the sealing base together.

In one embodiment, the tongue-in-groove structure of the male projection 519 and the female groove 539 preferably prevents smoke from escaping laterally between the bottom major surface 538 of the chimney stack 504 and the top major surface 518 of the sealing base 506.

In one embodiment, opposing threads may be used for releasably securing the chimney stack to the sealing base. In one embodiment, the chimney stack may include a male part having external threads and the sealing base may include a female part having internal threads that mesh with the external threads of the chimney stack. In one embodiment, the chimney stack may be disassembled from the sealing base by unscrewing the chimney stack from the sealing base. A second, replacement chimney stack may then be screwed onto the sealing base for re-forming a useable cocktail smoking chimney.

In one embodiment, the chimney stack may include a female part having internal threads and the sealing base may include a male part having external threads that mesh with the internal threads of the chimney stack.

In one embodiment, a kit for infusing smoke into a beverage may include two or more porous screens having the same or different mesh sizes. In one embodiment, a kit for infusing smoke into a beverage may include two or more porous screens, whereby a second porous screen may be a replacement part that replaces a worn-out first porous screen.

In one embodiment, porous screens with different mesh sizes may be used for controlling the volume or the properties of the smoke that is infused into a beverage. In one embodiment, a first porous screen having a smaller mesh size may be used for larger combustible material (e.g., wood chips) and a second porous mesh screen having a larger mesh size may be used for smaller combustible material (e.g., wood powder).

Figure 18:
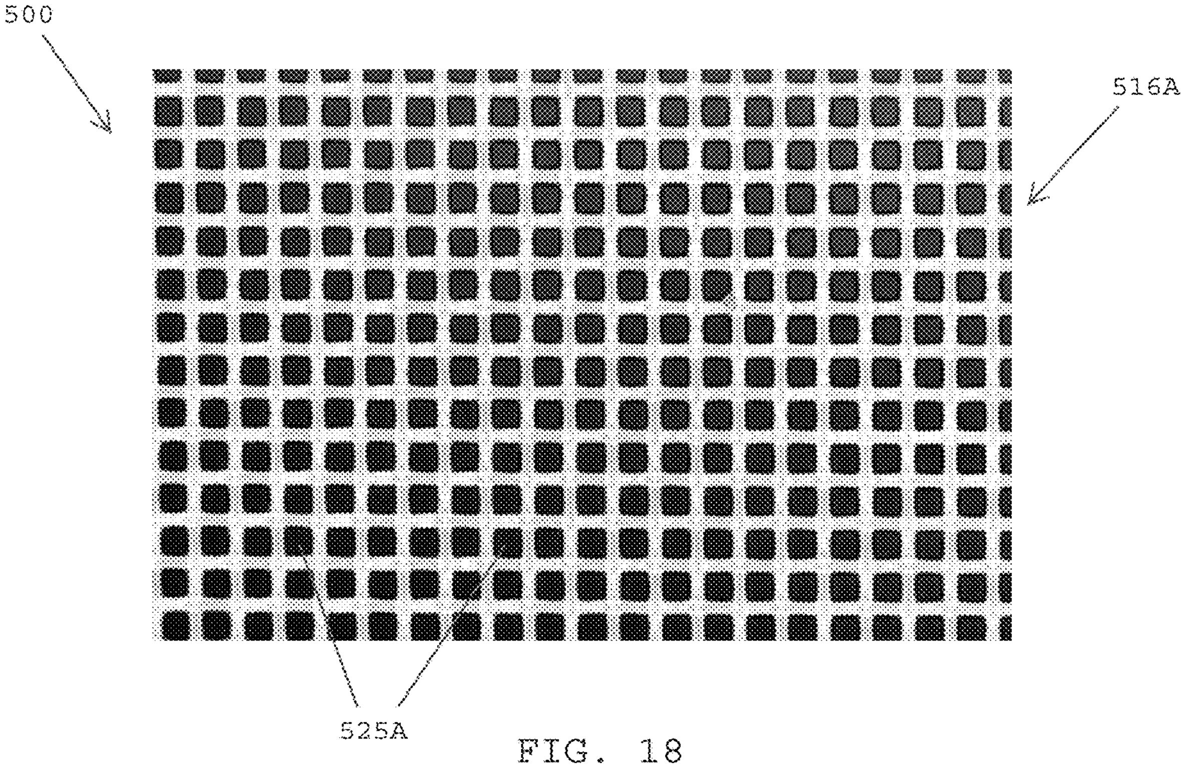
FIG. 18 shows a first porous screen of a cocktail smoking chimney kit having interchangeable parts, in accordance with one embodiment of the present patent application.
Figure 19:
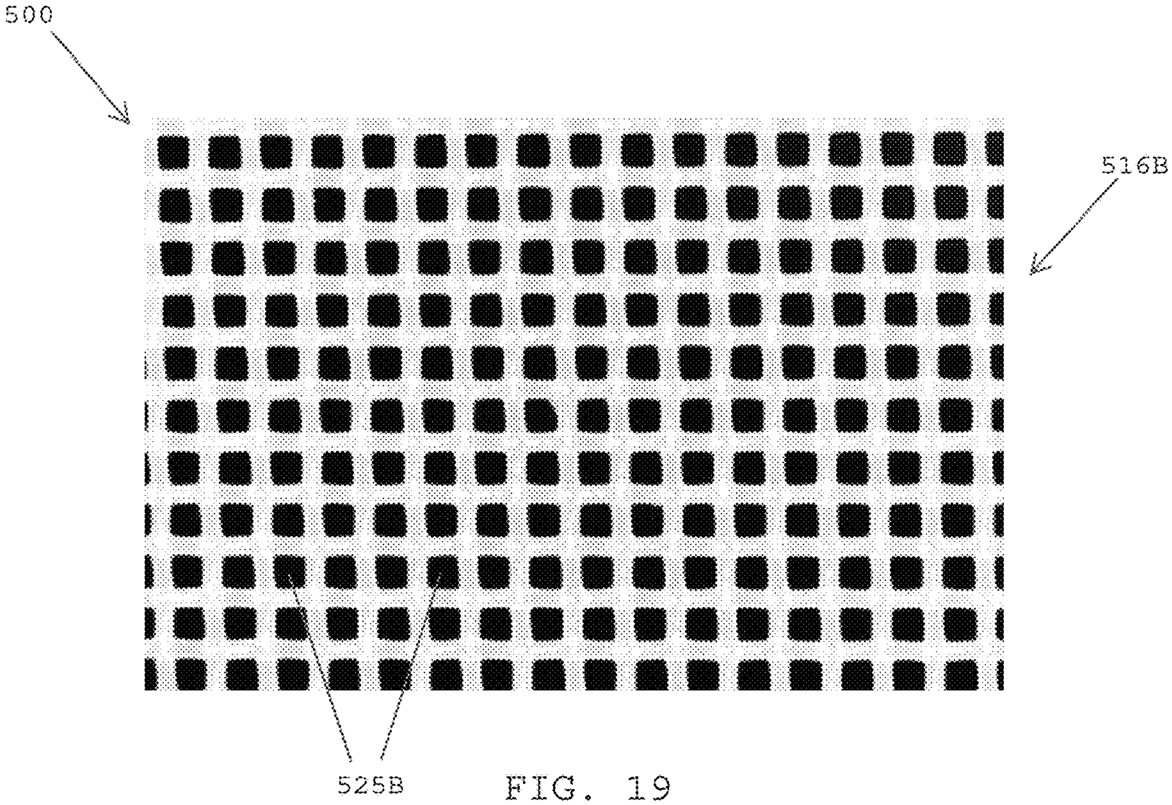
FIG. 19 shows a second porous screen of a cocktail smoking chimney kit having interchangeable parts, in accordance with one embodiment of the present patent application.

Referring to FIGS. 18 and 19, in one embodiment, a kit 500 for infusing smoke into a beverage preferably includes a first porous mesh 516A having a larger mesh size with smaller openings 525A, and a second porous mesh 516B having a smaller mesh size with larger openings 525B. In one embodiment, the first and second porous meshes 516A, 516B are interchangeable and may be disposed one at a time within a central opening in a chimney stack 104 (FIG. 2) of a cocktail smoking chimney.

In one embodiment, a kit for infusing smoke into a beverage may include two or more sealing bases that may be assembled with a chimney stack for making a cocktail smoking chimney. In one embodiment, each of the two or more sealing bases preferably have respective smoke transfer openings having different sizes for controlling the volume and/or the properties of the smoke that is infused into a beverage.

Figure 20:
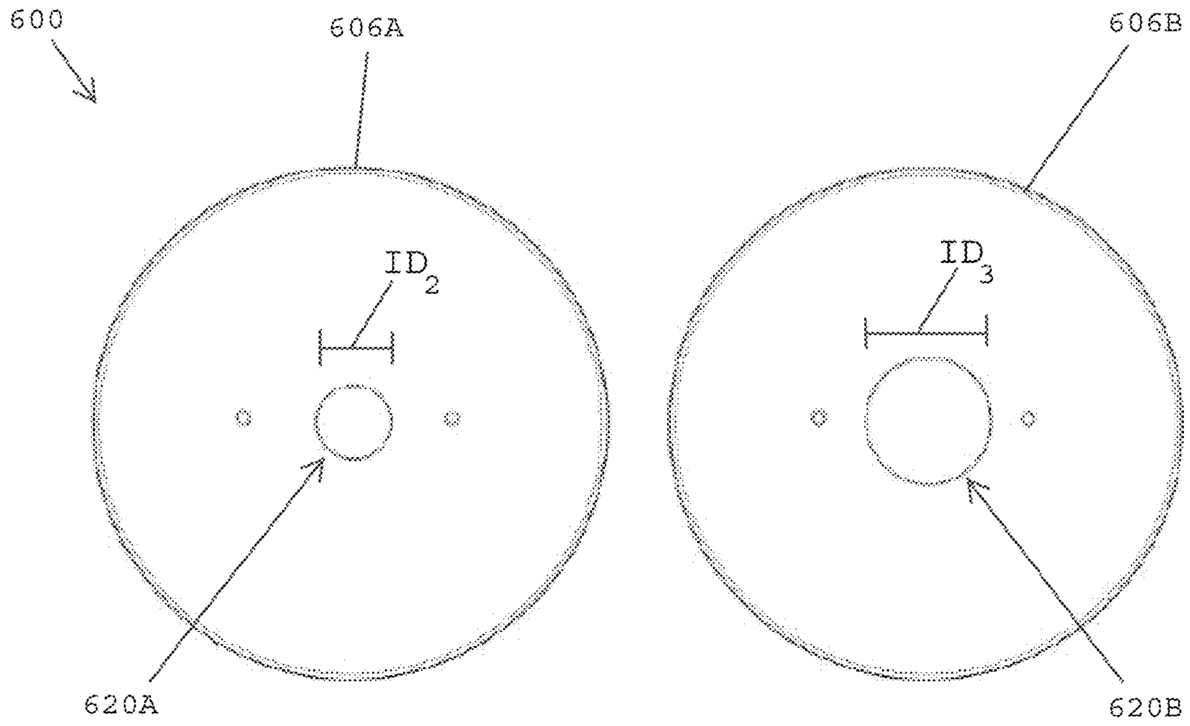
FIG. 20 is a top plan view of a first sealing base and a second sealing base of a cocktail smoking chimney kit having interchangeable parts, in accordance with one embodiment of the present patent application.

Referring to FIG. 20, in one embodiment, a kit 600 for infusing smoke into a beverage preferably includes a first sealing base 606A having a first smoke transfer opening 620 with an inner diameter $ID_2$ and a second sealing base 606B having a second smoke transfer opening 620B with an inner diameter $ID_3$ that is larger than the inner diameter $ID_2$ of the first smoke transfer opening 620A. The first and second sealing bases 606A, 606B are interchangeable. In one embodiment, based upon the volume of smoke desired, an operator may select one of the sealing bases for being assembled with a chimney stack. In one embodiment, the first sealing base 606A is selected when an operator desires a lower volume of smoke to be infused into a beverage. In one embodiment, the second sealing base 606B is selected when an operator desires a higher volume of smoke to be infused into a beverage.

In one embodiment, the first and second sealing bases 606A, 606B may be used as replacement parts. In one embodiment, the first sealing base 606A may be used until it wears out. At that stage, the first sealing base may be disassembled from a chimney stack 104 (FIG. 2) and replaced by the second sealing base 606B.

In one embodiment, the first and second sealing bases 606A, 606B may be made of different materials that preferably provide a different flavor to the smoke that is infused into a beverage. In one embodiment, the first sealing base 606A may be made of a first type of wood (e.g., oak) that provides an oak flavor to the smoke, and the second sealing base 606B may be made of a second type of wood (e.g., cherry) that provides a cherry oak flavor to the smoke. In one embodiment, one or more of the first and second sealing bases 606A, 606B may be made of metal.

Figure 21:
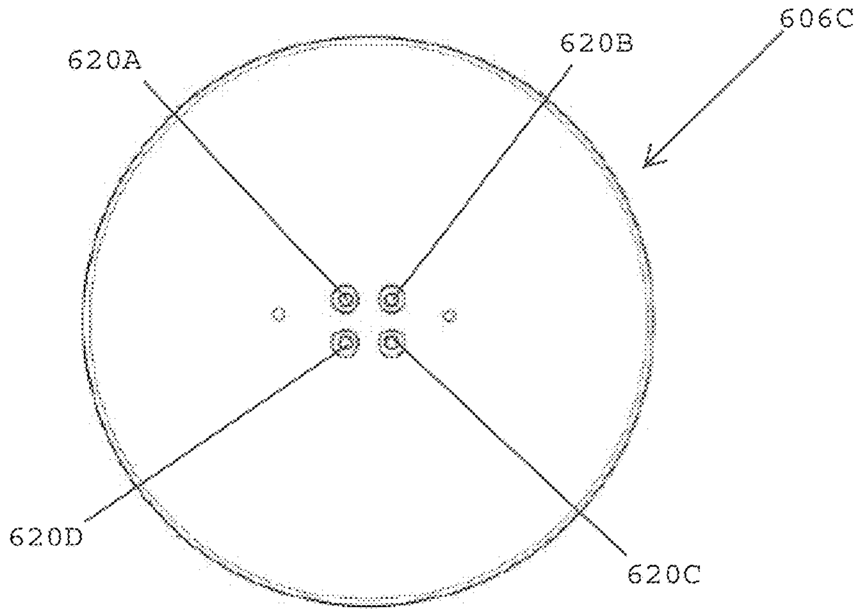
FIG. 21 is a top plan view of a third sealing base of a cocktail smoking chimney kit having interchangeable parts, in accordance with one embodiment of the present patent application.

Referring to FIG. 21, in one embodiment, a kit for infusing smoke into a beverage may include a third sealing base 606C having a plurality of spaced smoke transfer openings 620A-602D that allow smoke to pass through the third sealing base for infusing smoke into a beverage. In one embodiment, the smoke transfer openings 118A-118D desirably provide fluid communication between the combustion chamber located inside the chimney stack and the underside of the sealing base so that smoke may pass through the smoke transfer openings for being directed to flow from the top side to the bottom side of the sealing base.

Referring to FIGS. 20 and 21, in one embodiment, an operator may choose and/or select one of the three sealing bases 606A-606C for being assembled with a chimney stack for different reasons including but not limited to 1) replacing a worn-out sealing base, 2) controlling the volume of smoke that is infused into a beverage, and 3) changing the flavor of the smoke that is infused into a beverage.

In one embodiment, a kit for infusing smoke into a beverage many include two or more chimney stacks, two or more porous screens, and two or more sealing bases. Each of the two or more chimney stacks may be made or different materials, may have different sizes, and may have different openings provided at the lower ends of the respective combustion chambers. Each of the porous screens may be made of different materials and may have different mesh sizes. Each of the sealing bases may be made of different materials, may have different sizes and dimensions, and may have different designs for the smoke transfer openings.

In one embodiment, a kit preferably includes interchangeable replacement parts for the chimney stack, the porous screen, and the sealing base. When a part wears out, a second replacement part may be used in its place. For example, if a first chimney stack is worn out, if may be disassembled from a sealing base and a new, second chimney stack may be assembled with the sealing base. Porous screens and sealing bases may be replaced in a similar manner.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A cocktail smoking chimney for infusing smoke into a beverage comprising:
- a sealing base having a top major surface, a bottom major surface, and one or more smoke transfer openings extending from said top major surface to said bottom major surface of said sealing base;
- a first chimney stack having an upper end, a lower end with a bottom major surface, and a central opening extending from said upper end to said lower end of said first chimney stack, wherein said central opening of said first chimney stack is aligned with said one or more smoke transfer openings of said sealing base;
- a porous screen disposed inside said central opening of said first chimney stack, adjacent said lower end of said chimney stack;
- one or more fastening elements having a first configuration for securing said first chimney stack to said sealing base and a second configuration for releasing said first chimney stack from said sealing base;
- a smoke directing depression formed in said bottom major surface of said sealing base that circumscribes said one or more smoke transfer openings.

2. The cocktail smoking chimney as claimed in claim 1, wherein said central opening of said first chimney stack and said porous screen define a combustion chamber that is configured to receive a combustible material.

3. The cocktail smoking chimney as claimed in claim 1, wherein said first chimney stack is made of wood or metal.

4. The cocktail smoking chimney as claimed in claim 1, wherein said first chimney stack is made of wood that is selected from the group of wood consisting of apple, hickory, pecan, maple, cherry, oak, barrel-aged wood, and wood infused with mesquite.

5. The cocktail smoking chimney as claimed in claim 1, further comprising:
- a second chimney stack that is designed to replace said first chimney stack;
- wherein said one or more fastening elements are moveable into the second configuration for releasing said first chimney stack from said sealing base;
- wherein said one or more fastening elements are moveable into the first configuration for securing said second chimney stack from said sealing base.

6. The cocktail smoking chimney as claimed in claim 1, wherein said sealing base is made of metal or wood.

7. The cocktail smoking chimney as claimed in claim 1, wherein said one or more fastening elements comprise one or more threaded screws that are adapted to pass through said sealing base and said first chimney stack.

8. The cocktail smoking chimney as claimed in claim 1, wherein when said first chimney stack is secured to said sealing base said bottom major surface of said first chimney stack engages said top major surface of said sealing base.

9. The cocktail smoking chimney as claimed in claim 1, wherein said sealing base has a center, and wherein said first chimney stack is aligned with the center of said sealing base.

10. The cocktail smoking chimney as claimed in claim 9, wherein said smoke directing depression is aligned with the center of said sealing base.

11. The cocktail smoking chimney as claimed in claim 10, wherein upper ends of said one or more smoke transfer openings are in communication with said central opening of said first chimney stack and lower ends of said one or more smoke transfer openings are surrounded by said smoke directing depression.

12. The cocktail smoking chimney as claimed in claim 1, wherein said sealing base has a disc shape.

13. The cocktail smoking chimney as claimed in claim 1, further comprising a combustible material disposed within said combustion chamber of said first chimney stack, wherein said combustible material is selected from the group consisting of wood chips, wood powder, and spices.

14. A kit for infusing smoke into a beverage comprising:
- a sealing base having a top major surface, a bottom major surface, and one or more smoke transfer openings extending from said top major surface to said bottom major surface of sealing base;
- two or more chimney stacks that are adapted to be secured over said top major surface of said sealing base, each said chimney stack having an upper end, a lower end with a bottom major surface, and a central opening extending from said upper end to said lower end of said chimney stack, wherein said central opening of said chimney stack is aligned with said one or more smoke transfer openings of said sealing base;
- a porous screen disposed inside said central opening of said chimney stack, directly adjacent said lower end of said central opening of said chimney stack, wherein said central opening of said chimney stack and said porous screen define a combustion chamber of said chimney stack;
- one or more fastening elements having a first configuration for securing said two or more chimney stacks to said sealing base and a second configuration for releasing said two or more chimney stacks from said sealing base, wherein only one of said two or more chimney stacks is secured over said top major surface of said sealing base at any one time;
- smoke directing depression formed in said bottom major surface of said sealing base that circumscribes said one or more smoke transfer openings.

15. A cocktail smoking chimney for infusing smoke into a beverage comprising:
- a sealing base having a top major surface, a bottom major surface, and one or more smoke transfer openings extending from said top major surface to said bottom major surface of said sealing base;
- a first chimney stack having an upper end, a lower end with a bottom major surface, and a central opening extending from said upper end to said lower end of said first chimney stack, wherein said central opening of said first chimney stack is aligned with said one or more smoke transfer openings of said sealing base;

a porous screen disposed inside said central opening of said first chimney stack, adjacent said lower end of said chimney stack;

a smoke directing depression formed in said bottom major surface of said sealing base that circumscribes said one or more smoke transfer openings.

16. The cocktail smoking chimney as claimed in claim 15, further comprising:

a second chimney stack that is designed to replace said first chimney stack.

* * * * *